United States Patent
Yasuie et al.

(10) Patent No.: US 9,450,847 B2
(45) Date of Patent: Sep. 20, 2016

(54) MISMATCH DETECTING METHOD, DETECTING DEVICE, AND RECORDING MEDIUM

(71) Applicant: FUJITSU LIMITED, Kawasaki-shi, Kanagawa (JP)

(72) Inventors: Takeshi Yasuie, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 14/308,781

(22) Filed: Jun. 19, 2014

(65) Prior Publication Data
US 2015/0023371 A1   Jan. 22, 2015

(30) Foreign Application Priority Data
Jul. 17, 2013 (JP) ................................. 2013-148178

(51) Int. Cl.
H04L 12/26 (2006.01)
H04L 5/16 (2006.01)
H04L 12/40 (2006.01)

(52) U.S. Cl.
CPC ....... H04L 43/0864 (2013.01); H04L 43/0829 (2013.01); H04L 43/50 (2013.01); H04L 5/16 (2013.01); H04L 12/40136 (2013.01)

(58) Field of Classification Search
CPC ........... H04L 43/0864; H04L 43/0829; H04L 43/50; H04L 5/16; H04L 12/2697; H04L 65/80; H04L 5/14
See application file for complete search history.

(56) References Cited

U.S. PATENT DOCUMENTS

| | | | |
|---|---|---|---|
| 6,614,763 B1 | 9/2003 | Kikuchi et al. | |
| 7,742,439 B2 * | 6/2010 | Young | H04L 5/16 370/242 |
| 2006/0221843 A1 * | 10/2006 | Cidon | H04L 12/2697 370/248 |
| 2006/0280132 A1 * | 12/2006 | Connor | H04L 5/14 370/276 |
| 2006/0280133 A1 * | 12/2006 | Nomura | H04L 12/40136 370/276 |
| 2008/0037443 A1 * | 2/2008 | Ansari | H04L 65/80 370/254 |
| 2009/0003225 A1 * | 1/2009 | Klassen | H04L 12/2697 370/250 |

FOREIGN PATENT DOCUMENTS

| | | |
|---|---|---|
| JP | 2000-134216 | 5/2000 |
| JP | 2000-224172 | 8/2000 |
| JP | 2006-345224 | 12/2006 |

\* cited by examiner

*Primary Examiner* — Chi H Pham
*Assistant Examiner* — Shailendra Kumar
(74) *Attorney, Agent, or Firm* — Staas & Halsey LLP

(57) ABSTRACT

A mismatch detecting method includes: specifying a configuration of test data in accordance with a condition in which a time when a first packet out of a plurality of packets included in the test data caused to make a round trip through a transmission path including a plurality of sections is transmitted in one section out of the plural sections in an inbound path and a time when a second packet out of the plural packets is transmitted in the one section in an outbound path overlap with each other; transmitting the test data to the transmission path in accordance with the configuration specified by the specifying; and determining a mismatch of a transmission system within the transmission path, based on a loss situation of the test data returning from the transmission path after the transmitting.

9 Claims, 36 Drawing Sheets

FIG. 16

| | NUMBER OF SECTIONS | FIRST SECTION | SECOND SECTION | THIRD SECTION |
|---|---|---|---|---|
| FIRST CONFIGURATION PATTERN | 3 | HIGH SPEED | LOW SPEED | HIGH SPEED |
| SECOND CONFIGURATION PATTERN | 3 | LOW SPEED | HIGH SPEED | LOW SPEED |
| ... | ... | ... | ... | ... |

FIG. 18

|  | FIRST DETERMINATION PATTERN | SECOND DETERMINATION PATTERN | THIRD DETERMINATION PATTERN | FOURTH DETERMINATION PATTERN |
|---|---|---|---|---|
| USUAL SYSTEM | NOT DETECTED | DETECTED | NOT DETECTED | NOT DETECTED |
| THIRD HIGH-SPEED SYSTEM | NOT DETECTED | NOT INVOLVED | DETECTED | NOT DETECTED |
| FIRST HIGH-SPEED SYSTEM | NOT DETECTED | NOT INVOLVED | NOT DETECTED | DETECTED |
| DETERMINATION RESULT | NO MISMATCH SECTION | MISMATCH EXISTS IN SECOND SECTION | MISMATCH EXISTS IN THIRD SECTION | MISMATCH EXISTS IN FIRST SECTION |

FIG. 28

|  | FIRST DETERMINATION PATTERN | SECOND DETERMINATION PATTERN | THIRD DETERMINATION PATTERN | FOURTH DETERMINATION PATTERN |
|---|---|---|---|---|
| FIRST USUAL SYSTEM | NOT DETECTED | DETECTED | NOT DETECTED | NOT DETECTED |
| SECOND USUAL SYSTEM | NOT DETECTED | NOT INVOLVED | DETECTED | NOT DETECTED |
| SECOND HIGH-SPEED SYSTEM | NOT DETECTED | NOT INVOLVED | NOT INVOLVED | DETECTED |
| DETERMINATION RESULT | NO MISMATCH SECTION | MISMATCH EXISTS IN THIRD SECTION | MISMATCH EXISTS IN FIRST SECTION | MISMATCH EXISTS IN SECOND SECTION |

MISMATCH DETECTING METHOD, DETECTING DEVICE, AND RECORDING MEDIUM

CROSS-REFERENCE TO RELATED APPLICATION

This application is based upon and claims the benefit of priority of the prior Japanese Patent Application No. 2013-148178, filed on Jul. 17, 2013, the entire contents of which are incorporated herein by reference.

FIELD

The embodiment discussed herein is related to a mismatch detection technique for a transmission system in a network.

BACKGROUND

A Duplex mismatch indicates a state where different Duplex modes such as, for example, a full duplex mode and a half duplex mode are set between node devices connected by means of a network.

In a case where a section is put into a Duplex mismatch, a packet in an uplink direction and a packet in a downlink direction collide with each other in that section, and a packet loss occurs.

If the amount of traffic increases in a transmission path including the section put into the Duplex mismatch, a throughput or a response is deteriorated. In this regard, however, it is difficult to detect the Duplex mismatch using simple connectivity confirmation such as a ping.

In the related art, there is disclosed a technique detecting that a section within a transmission path has been put into a Duplex mismatch, by continuously transmitting test messages.

As examples of the related art, Japanese Laid-open Patent Publication No. 2006-345224, Japanese Laid-open Patent Publication No. 2000-134216, and Japanese Laid-open Patent Publication No. 2000-224172 have been known.

SUMMARY

According to an aspect of the invention, a mismatch detecting method includes: specifying a configuration of test data in accordance with a condition in which a time when a first packet out of a plurality of packets included in the test data caused to make a round trip through a transmission path including a plurality of sections is transmitted in one section out of the plural sections in an inbound path and a time when a second packet out of the plural packets is transmitted in the one section in an outbound path overlap with each other; transmitting the test data to the transmission path in accordance with the configuration specified by the specifying; and determining a mismatch of a transmission system within the transmission path, based on a loss situation of the test data returning from the transmission path after the transmitting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 illustrates an example of a configuration pattern table;
FIG. 18 illustrates an example of a determination pattern;
FIG. 28 illustrates an example of a determination pattern.

DESCRIPTION OF EMBODIMENT

Depending on an environment of a transmission path, is some cases it has been difficult to detect a Duplex mismatch using the related art.

In a case where packets are continuously transmitted in a transmission path including sections whose communication speeds are different, packets are transmitted in a state of being continuous, in a section in which low-speed communication is performed. However, a packet interval widens in a section in which high-speed communication is performed. In other words, time zones occupied by packets become scattered.

Therefore, a phenomenon occurs where a packet included in an uplink message and a packet included in a downlink message go by each other without colliding with each other, in a section in which high-speed communication is performed. Accordingly, in many cases, only by continuously transmitting packets in a simple manner, it has been difficult to detect a section put into a Duplex mismatch.

In a detecting device according to the present embodiment, a Duplex mismatch in a transmission path including sections whose communication speeds are different is detected.

Figure 1:
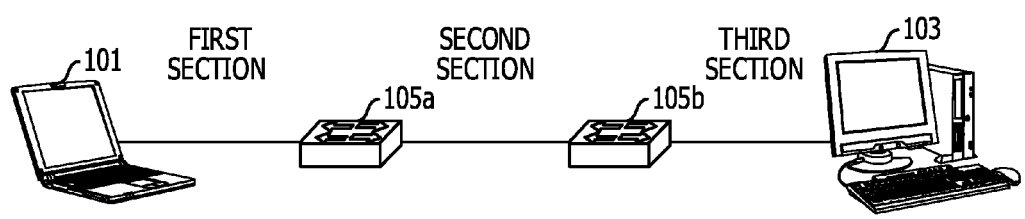
FIG. 1 illustrates an example of a configuration of a network.

FIG. 1 illustrates an example of the configuration of a network. A detecting device 101 detects an incorrect setting in a node device included in a transmission path. In a case where, as for two adjacent node devices, for example, one node device is set to a full duplex system and the other node device is set to a half duplex system, a mismatch turns out to exist in a section linking the two node devices with each other.

The detecting device 101 detects a mismatch existing in one section within the transmission path. The detecting device 101 is located at the end of a source side in the transmission path. A test target device 103 is located at the end of a destination side in the transmission path. The detecting device 101 transmits a test message addressed to the test target device 103, and when having receiving the test message, the test target device 103 sends back the received message to the detecting device 101. The test message sent from the detecting device 101 to the test target device 103 is called a request message. The test message sent from the test target device 103 to the detecting device 101 is called a response message.

If a packet of the request message and a packet of the response message have simultaneously arrived in a section in which a mismatch exists, the packet of the request message and the packet of the response message disappear without being normally transmitted. This phenomenon is called a collision. Based on the ratio of packets of the received response message to packets of the transmitted request message, the detecting device 101 detects that a collision has occurred. In a case of having detected the collision, it is estimated that a mismatch exists in one section within the transmission path.

Between the detecting device 101 and the test target device 103, a first relay device 105a and a second relay device 105b exist. Accordingly, the transmission path in this example is divided into a first section whose both ends are the detecting device 101 and the first relay device 105a, a second section whose both ends are the first relay device 105a and the second relay device 105b, and a third section whose both ends are the second relay device 105b and the test target device 103. In the present embodiment, a mismatch in a section in which high-speed communication is performed is detected. In addition, not only the existence of the mismatch is detected but also the section in which the mismatch exists is specified.

Figure 2:
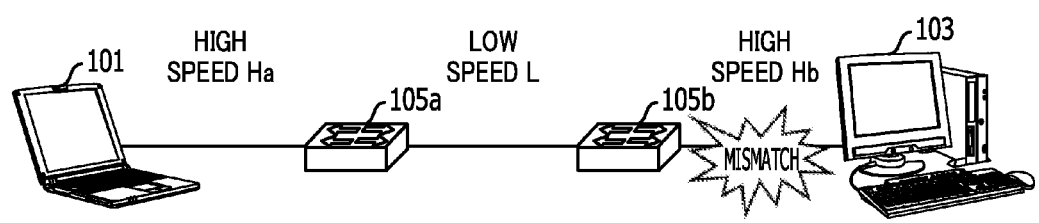
FIG. 2 illustrates an example of a mismatch section.

In an example illustrated in FIG. 2, the first section is connected using a local area network (LAN), and communication is performed therein at high speed. The second section is connected using a wide area network (WAN), and communication is performed therein at low speed. The third section is connected using a LAN, and communication is performed therein at high speed. Hereinafter, in this example, a communication speed in the first section is expressed by Ha. In the same way, a communication speed in the second section is expressed by L. In the same way, a communication speed in the third section is expressed by Hb.

Figure 3:
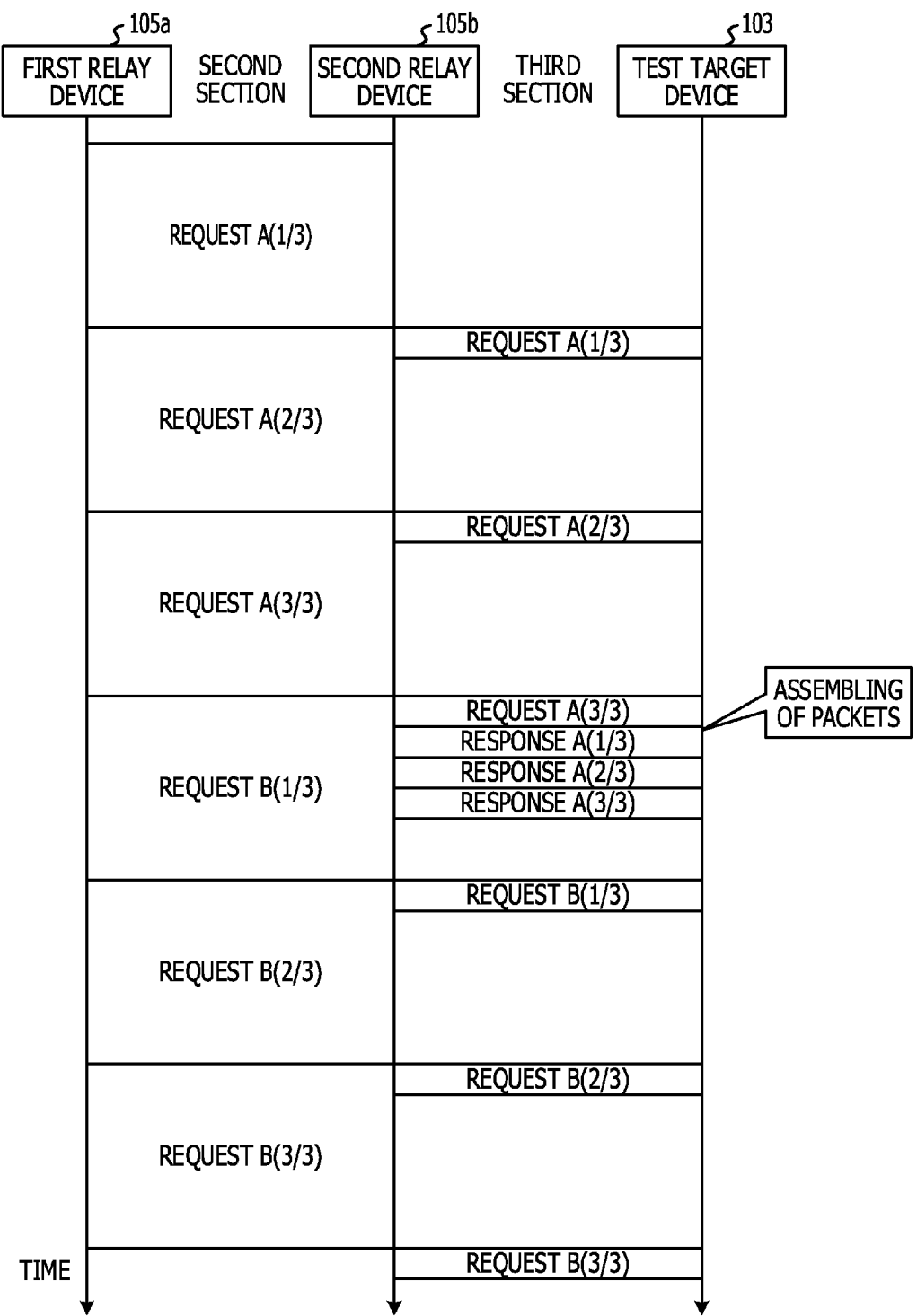
FIG. 3 illustrates a situation of data transmission.

FIG. 3 illustrates the situation of data transmission in a case where a mismatch exists in the third section. This diagram illustrates the situation of data transmission in the second section and the situation of data transmission in the third section. The situation of data transmission in the first section is omitted.

Each of axes in a downward direction indicates an elapsed time. A rectangle illustrated in a section indicates a transmission time of a packet in the corresponding section. Since communication is performed at low speed in the second section and communication is performed at high speed in the third section, each rectangle in the second section is larger than a corresponding rectangle in the third section.

In this example, one request message is divided into three packets. A rectangle indicated by "request A(1/3)" indicates a transmission time of the first packet out of three packets divided from a request message A. A rectangle indicated by "request A(2/3)" indicates a transmission time of the second packet out of the three packets divided from the request message A. A rectangle indicated by "request A(3/3)" indicates a transmission time of the third packet out of the three packets divided from the request message A.

In the second section, the rectangle indicated by "request A(1/3)", the rectangle indicated by "request A(2/3)", and the rectangle indicated by "request A(3/3)" are continuous with each other. In other words, the three packets divided from the request message A are transmitted in a state of being continuous.

Packets having sequentially arrived at the second relay device 105b are sent out to the third section without waiting for the arrival of subsequent packets. Therefore, the three packets divided from the request message A are transmitted with leaving spaces therebetween. In the third section, spaces are left between the rectangle indicated by "request A(1/3)", the rectangle indicated by "request A(2/3)", and the rectangle indicated by "request A(3/3)".

After the arrival of subsequent packets included in the same request message, the test target device 103 assembles packets, and reconstructs the request message. In addition, the test target device 103 divides again a response message equal to the reconstructed request message into three, and sequentially sends out the divided packets to the third section.

In the diagram, a rectangle indicated by "response A(1/3)" indicates a transmission time of the first packet out of three packets divided from a response message A. In the same way, a rectangle indicated by "response A(2/3)" indicates a transmission time of the second packet out of the three packets divided from the response message A. In the same way, a rectangle indicated by "response A(3/3)" indicates a transmission time of the third packet out of the three packets divided from the response message A.

In the third section, the rectangle indicated by "response A(1/3)", the rectangle indicated by "response A(2/3)", and the rectangle indicated by "response A(3/3)" are continuous with each other. In other words, the three packets divided from the response message A are transmitted in a state of being continuous.

At this time, as illustrated in the diagram, in the second section, three packets divided from a request message B subsequent to the request message A are transmitted in the same way as in the case of the request message A. Also in the third section, these packets are transmitted in the same way as in the case of the request message A. Accordingly, in the third section, between the transmission time of the third packet out of the three packets divided from the response message A and the transmission time of the first packet out of the three packets divided from the request message B, a time period during which no packet relating to the request message is transmitted occurs. A time period between the rectangle indicated by "response A(3/3)" in the third section and a rectangle indicated by "request B(1/3)" correspond to this time period.

As illustrated in the diagram, the three packets divided from the response message A turn out to be transmitted during this time period. In addition, this phenomenon is repeated in a subsequent message. Therefore, packets divided from a request message and packets divided from a response message do not cause a collision.

In a case where, in the same way as in the third section in this example, high-speed communication is performed in a section located at a destination-side end, in some cases a mismatch is not detected even if existing in the section. Hereinafter, two examples for detecting a mismatch in a high-speed communication section located at the destination-side end will be described.

Using FIG. 4, a first example will be described. In this example, the number of packets divided from a test message is increased.

In the same way as described above, each of axes in a downward direction indicates an elapsed time. In addition, in the same way as described above, a rectangle illustrated in a section indicates a transmission time of a packet in the corresponding section. The size of the packet is the same as in the case of FIG. 3. Accordingly, the sizes of a rectangle in the second section and a corresponding rectangle in the third section are the same as in the case of FIG. 3.

In this example, one request message is divided into six packets. A rectangle indicated by "request A(1/6)" indicates a transmission time of the first packet out of six packets divided from the request message A. A rectangle indicated by "request A(2/6)" indicates a transmission time of the second packet out of the six packets divided from the request message A. A rectangle indicated by "request A(3/6)" indicates a transmission time of the third packet out of the six packets divided from the request message A. A rectangle indicated by "request A(4/6)" indicates a transmission time of the fourth packet out of the six packets divided from the request message A. A rectangle indicated by "request A(5/6)" indicates a transmission time of the fifth packet out of the six packets divided from the request message A. A rectangle indicated by "request A(6/6)" indicates a transmission time of the sixth packet out of the six packets divided from the request message A.

In the second section, the rectangle indicated by "request A(1/6)", the rectangle indicated by "request A(2/6)", the rectangle indicated by "request A(3/6)", the rectangle indicated by "request A(4/6)", the rectangle indicated by "request A(5/6)", and the rectangle indicated by "request A(6/6)" are continuous with each other. In other words, the six packets divided from the request message A are transmitted in a state of being continuous.

In the same way as in the case of FIG. 3, packets having sequentially arrived at the second relay device 105b are sent out to the third section without waiting for the arrival of subsequent packets. Therefore, the six packets divided from the request message A are transmitted with leaving spaces therebetween. In the third section, spaces are left between the rectangle indicated by "request A(1/6)", the rectangle indicated by "request A(2/6)", the rectangle indicated by "request A(3/6)", the rectangle indicated by "request A(4/6)", the rectangle indicated by "request A(5/6)", and the rectangle indicated by "request A(6/6)". Each of the spaces has the same size as in the case of FIG. 3.

In the same way as in the case of FIG. 3, after the arrival of subsequent packets included in the same request message, the test target device 103 assembles packets, and reconstructs the request message. In addition, the test target device 103 divides again a response message equal to the reconstructed request message into six, and sequentially sends out the divided packets to the third section.

In the diagram, a rectangle indicated by "response A(1/6)" indicates a transmission time of the first packet out of six packets divided from the response message A. In the same way, a rectangle indicated by "response A(2/6)" indicates a transmission time of the second packet out of the six packets divided from the response message A. In the same way, a rectangle indicated by "response A(3/6)" indicates a transmission time of the third packet out of the six packets divided from the response message A. In the same way, a rectangle indicated by "response A(4/6)" indicates a transmission time of the fourth packet out of the six packets divided from the response message A. In the same way, a rectangle indicated by "response A(5/6)" indicates a transmission time of the fifth packet out of the six packets divided from the response message A. In the same way, a rectangle indicated by "response A(6/6)" indicates a transmission time of the sixth packet out of the six packets divided from the response message A.

In the same way as in the case of FIG. 3, in the third section, the rectangle indicated by "response A(1/6)", the rectangle indicated by "response A(2/6)", the rectangle indicated by "response A(3/6)", the rectangle indicated by "response A(4/6)", the rectangle indicated by "response A(5/6)", and the rectangle indicated by "response A(6/6)" are continuous with each other. In other words, the six packets divided from the response message A are transmitted in a state of being continuous.

At this time, as illustrated in the diagram, in the second section, six packets divided from the request message B subsequent to the request message A are transmitted in the same way as in the case of the request message A. Also in the third section, these packets are transmitted in the same way as in the case of the request message A.

Figure 4:
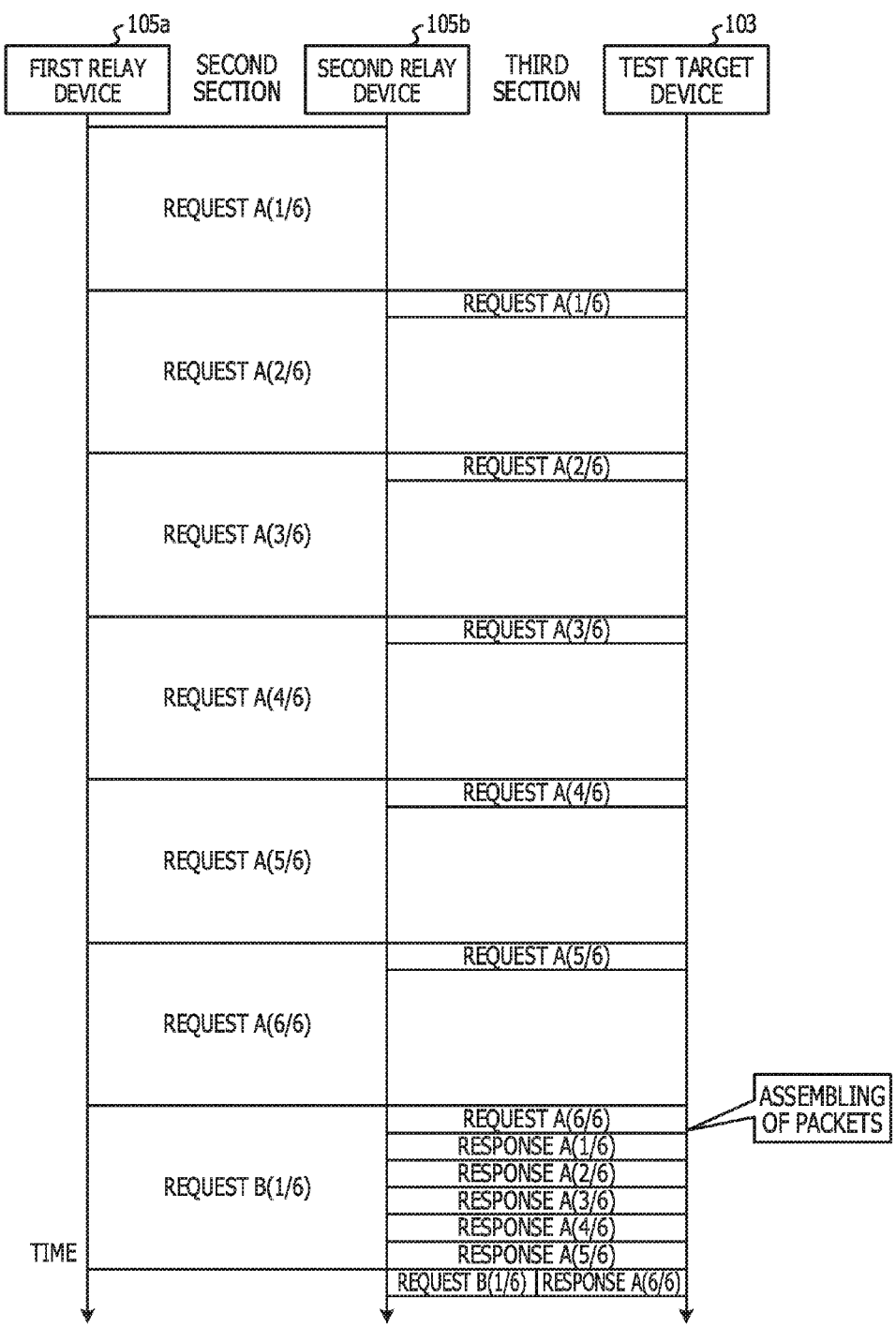
FIG. 4 illustrates a situation of data transmission.

In the case of FIG. 4, in the third section, the transmission time of the sixth packet out of the six packets divided from the response message A and the transmission time of the first packet out of the six packets divided from the request message B overlap with each other. Therefore, these two packets collide with each other, and are not normally transmitted.

In the case of FIG. 4, that a packet loss in the high-speed communication section located at the destination-side end occurs in this way leads to the detection of a mismatch in the high-speed communication section located at the destination-side end.

Next, using FIG. 5, another example for detecting a mismatch in the high-speed communication section located at the destination-side end will be described.

In the same way as described above, each of axes in a downward direction indicates an elapsed time. In addition, in the same way as described above, a rectangle illustrated in a section indicates a transmission time of a packet in the corresponding section.

The division number of packets are three in the same way as in the case of FIG. 3. In the same way as in the case of FIG. 3, a rectangle indicated by "request A(1/3)" indicates a transmission time of the first packet out of three packets divided from the request message A. In the same way, a rectangle indicated by "request A(2/3)" indicates a transmission time of the second packet out of the three packets divided from the request message A. In the same way, a rectangle indicated by "request A(3/3)" indicates a transmission time of the third packet out of the three packets divided from the request message A.

In the second section, in the same way as in the case of FIG. 3, the rectangle indicated by "request A(1/3)", the rectangle indicated by "request A(2/3)", and the rectangle indicated by "request A(3/3)" are continuous with each other. In the same way as in FIG. 3, the three packets divided from the request message A are transmitted in a state of being continuous.

In this regard, however, in this example, the transmission time of a packet is different from the case of FIG. 3. In the case of FIG. 3, since the sizes of the three divided packets are equal to one another, the transmission times of individual packets are equal. In this example, the third packet is larger than the first packet and the second packet. Therefore, in the second section, the transmission time of the third packet is longer than the transmission time of the first packet and the transmission time of the second packet.

In the same way as in the case of FIG. 3, packets having sequentially arrived at the second relay device 105*b* are sent out to the third section without waiting for the arrival of subsequent packets. Therefore, the six packets divided from the request message A are transmitted with leaving spaces therebetween. In the third section, a space between the rectangle indicted by "request A(1/3)" and the rectangle indicted by "request A(2/3)" is short. A space between the rectangle indicted by "request A(2/3)" and the rectangle indicted by "request A(3/3)" is long. A space between the rectangle indicted by "request A(3/3)" and a rectangle indicted by "request B(1/3)" is even shorter.

In the same way as in the case of FIG. 3, after the arrival of subsequent packets included in the same request message, the test target device 103 assembles packets, and reconstructs the request message. In addition, the test target device 103 divides again a response message equal to the reconstructed request message into three, and sequentially sends out the divided packets to the third section.

In the diagram, a rectangle indicated by "response A(1/3)" indicates a transmission time of the first packet out of three packets divided from the response message A. In the same way, a rectangle indicated by "response A(2/3)" indicates a transmission time of the second packet out of the three packets divided from the response message A. In the same way, a rectangle indicated by "response A(3/3)" indicates a transmission time of the third packet out of the three packets divided from the response message A. In this regard, however, also in the case of the response message, in the same way as in the case of the request message, the transmission time of the third packet is longer than the transmission time of the first packet and the transmission time of the second packet.

In the same way as in the case of FIG. 3, in the third section, the rectangle indicated by "response A(1/3)", the rectangle indicated by "response A(2/3)", and the rectangle indicated by "response A(3/3)" are continuous with each other. In other words, the three packets divided from the response message A are transmitted in a state of being continuous.

At this time, as illustrated in the diagram, in the second section, three packets divided from the request message B subsequent to the request message A are transmitted in the same way as in the case of the request message A. Also in the third section, these packets are transmitted in the same way as in the case of the request message A.

Figure 5:
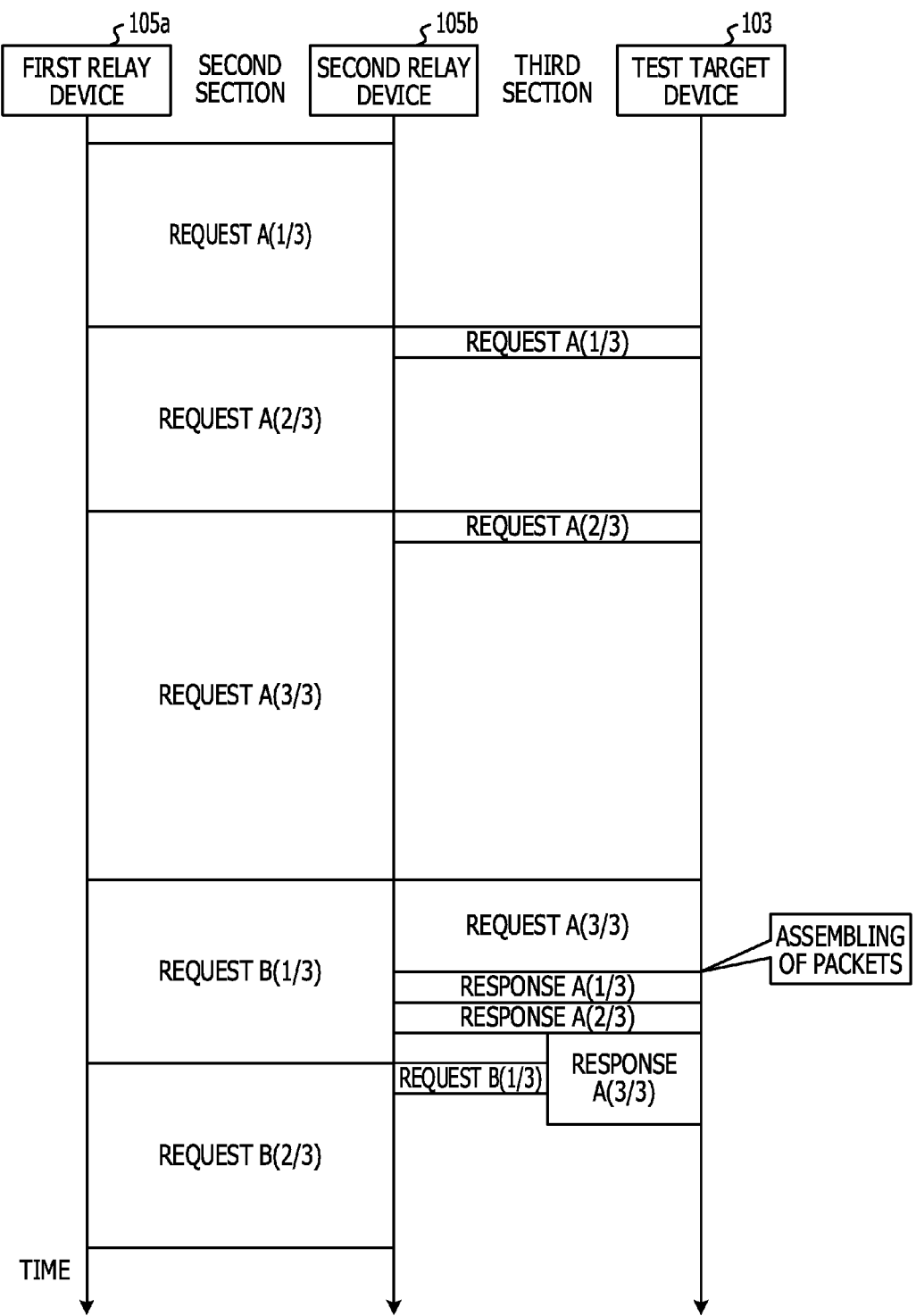
FIG. 5 illustrates a situation of data transmission.

In the case of FIG. 5, in the third section, the transmission time of the third packet out of the three packets divided from the response message A and the transmission time of the first packet out of the three packets divided from the request message B overlap with each other. Therefore, these two packets collide with each other, and are not normally transmitted.

Also in the case of FIG. 5, that a packet loss in the high-speed communication section located at the destination-side end occurs in this way leads to the detection of a mismatch in the high-speed communication section located at the destination-side end.

Next, the condition of test data will be described that is used for detecting a mismatch in the high-speed communication section located at the destination-side end as illustrated in FIG. 4 or FIG. 5. The condition of the test data is specified based on, for example, the configuration (the number of packets and a packet size) of a test message and the number of continuous test messages.

First, the configuration of a test message in the present embodiment will be described. There are a case where one packet corresponds to a test message and a case where a plurality of packets correspond to one test message. In a case where the test message is not divided, the number of packets becomes one. In a case where the test message is divided, the number of packets becomes n in accordance with a division number n.

In addition, divided packets may have a same size, and may have different sizes. In this example, it is assumed that the first to n–1-th packets have the same size. This size is expressed by P. In addition, it is assumed that the n-th packet has a size defined differently from the above-mentioned size P. This size is expressed by Q. In this regard, however, in a case where the value of the size Q is set to the same value as the size P, the sizes of the first to n-th packets are substantially equal.

Figure 6:
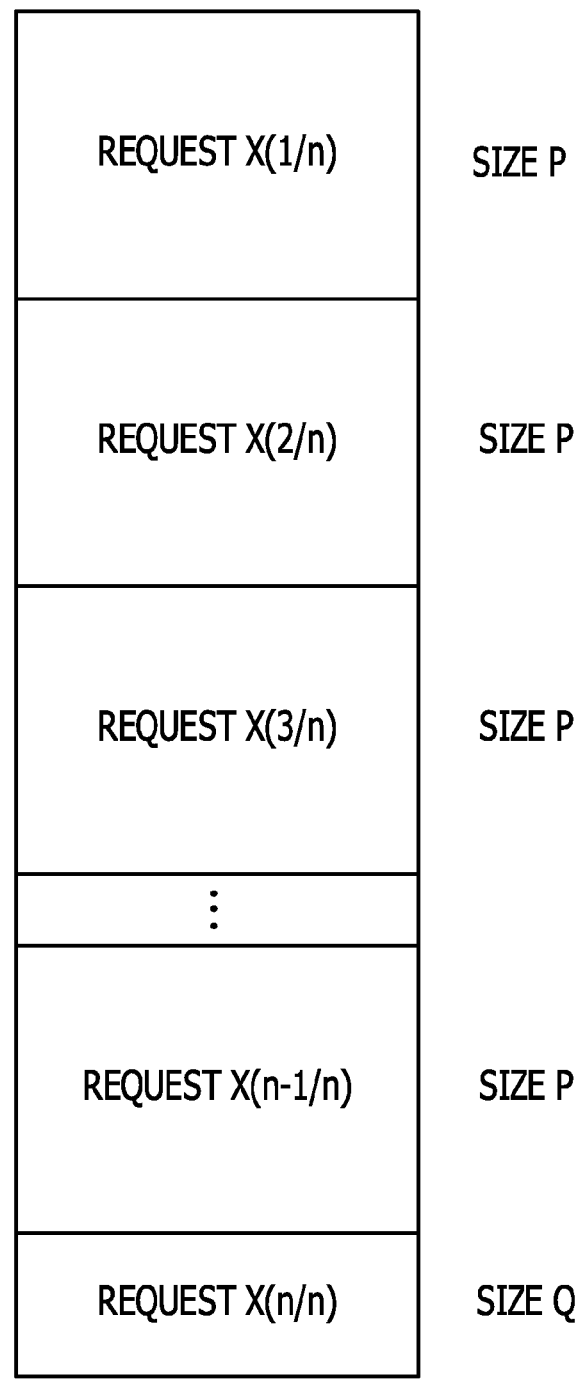
FIG. 6 illustrates an example of a configuration of a test message.

In FIG. 6, while a case of a request message X is adopted as an example, it is assumed that any one of continuous request messages has a same configuration. Furthermore, it is assumed that a response message has the same configuration as that of the request message.

Accordingly, the test message in this example is specified based on the number n of packets, the size P, and the size Q. Since the configuration illustrated in FIG. 6 is an exemplification, a test message based on a configuration other than the configuration illustrated in FIG. 6 may be used.

Figure 7:
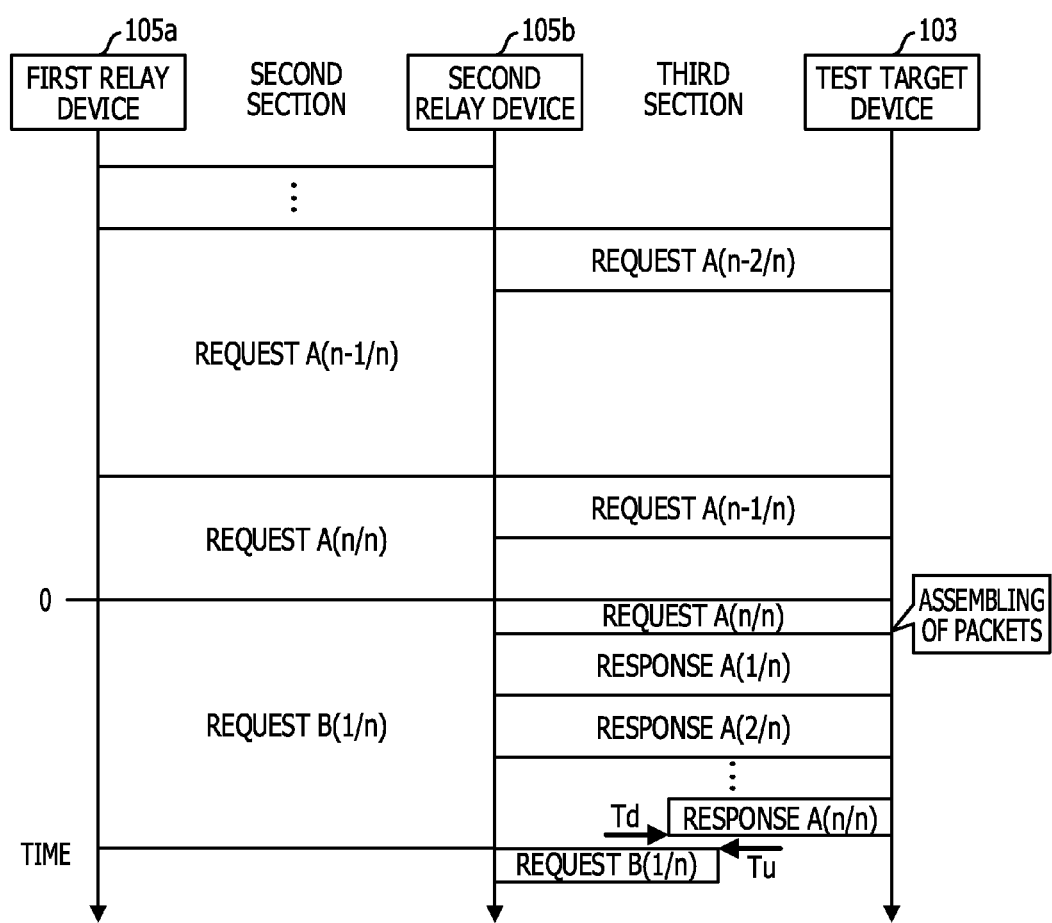
FIG. 7 is a diagram for explaining a condition where a loss occurs in a high-speed section on a destination side.

Next, using FIG. 7, a condition where a loss occurs in the high-speed section on the destination side will be described. In the same way as described above, each of axes in a downward direction indicates an elapsed time. In addition, in the same way as described above, a rectangle illustrated in a section indicates a transmission time of a packet in the corresponding section. The size of a packet is premised on the configuration of the test message illustrated in FIG. 6. In this diagram, an example where the n-th packet is smaller than the first to n–1-th packets is illustrated. However, the n-th packet may have the same size as the first to n–1-th packets. In addition, the n-th packet may be larger than the first to n–1-th packets.

Based on an elapsed time from a base point in time indicated by "0" in the diagram, a condition where a collision occurs will be derived. The base point in time indicates a timing when the transmission of a final packet of the request message A has finished in the second section and switching to the transmission of an initial packet in the subsequent request message B is performed. In addition, the base point in time correspond to a timing when the transmission of a final packet of the request message A is started in the third section.

In accordance with the diagram, an elapsed time Tu relating to a request message is compared with an elapsed time Td relating to a response message. The elapsed time Tu is a time from the base point in time until the transmission of the initial packet of the request message B is started in the third section. The elapsed time Td is a time from the base point in time until the transmission of a final packet of the response message A finishes in the third section.

In addition, if the elapsed time Td exceeds the elapsed time Tu as illustrated in the following conditional expression (1), a collision occurs.

$$Td > Tu \quad (1)$$

The elapsed time Tu corresponds to a time from the base point in time until the transmission of the initial packet of the request message B in the second section finishes. Therefore, by dividing the size P of the initial packet of the request message B by the communication speed L in the second section, the elapsed time Tu is obtained. In the following, an expression (2) for deriving the elapsed time Tu is expressed.

$$Tu = P/L \quad (2)$$

On the other hand, the elapsed time Td corresponds to the total time of the transmission time of the final packet of the request message A in the third section and the transmission time of the entire response message A in the third section.

The transmission time of the final packet of the request message A in the third section is obtained by dividing the size Q of the final packet by the communication speed Hb in the third section. In addition, the transmission time of the entire response message A in the third section is obtained by dividing the size $(n-1)P+Q$ of the entire response message by the communication speed Hb in the third section. Accordingly, the elapsed time Td is derived in accordance with the following expression (3).

$$Td = Q/Hb + ((n-1)P+Q)/Hb = ((n-1)P+2Q)/Hb \quad (3)$$

If the expression (2) and the expression (3) are substituted into the expression (1), the following conditional expression (4) is obtained.

$$P/L < ((n-1)P+2Q)/Hb \quad (4)$$

If, in response to the communication speed L in the second section and the communication speed Hb in the third section, the configuration of a test message is specified based on the number n of packets, the size P, and the size Q so as to satisfy this conditional expression, and a message according to that configuration is sent from the detecting device 101, a collision turns out to occur in the third section. In addition, under the premise that a condition where a collision occurs in the third section in this way is right, it is possible to verify the existence of a mismatch in the third section illustrated in FIG. 2. This is the end of the description of the detection condition in the case where a mismatch exists in the third section in which communication is performed at high speed.

Figure 8:
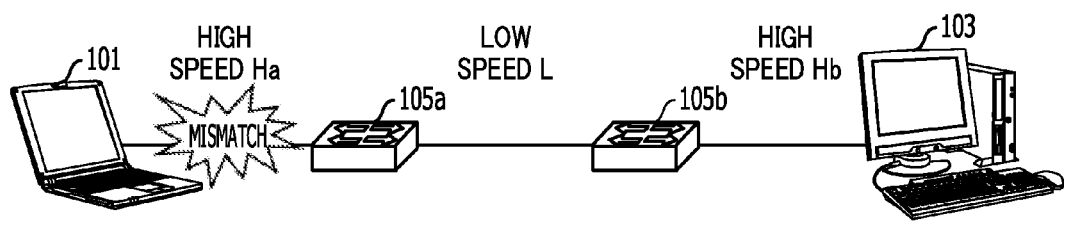
FIG. 8 illustrates an example of a mismatch section.

Next, a detection condition in a case where a mismatch exists in the first section will be described. FIG. 8 illustrates a situation where a mismatch exists in the first section. A communication speed in each section is the same as in the case of FIG. 2. In other words, the first section is connected using a LAN, and communication is performed therein at high speed. The second section is connected using a WAN, and communication is performed therein at low speed. The third section is connected using a LAN, and communication is performed therein at high speed. In the same way as in the above-mentioned example, a communication speed in the first section is expressed by Ha. In the same way, a communication speed in the second section is expressed by L. In the same way, a communication speed in the third section is expressed by Hb.

Figure 9:
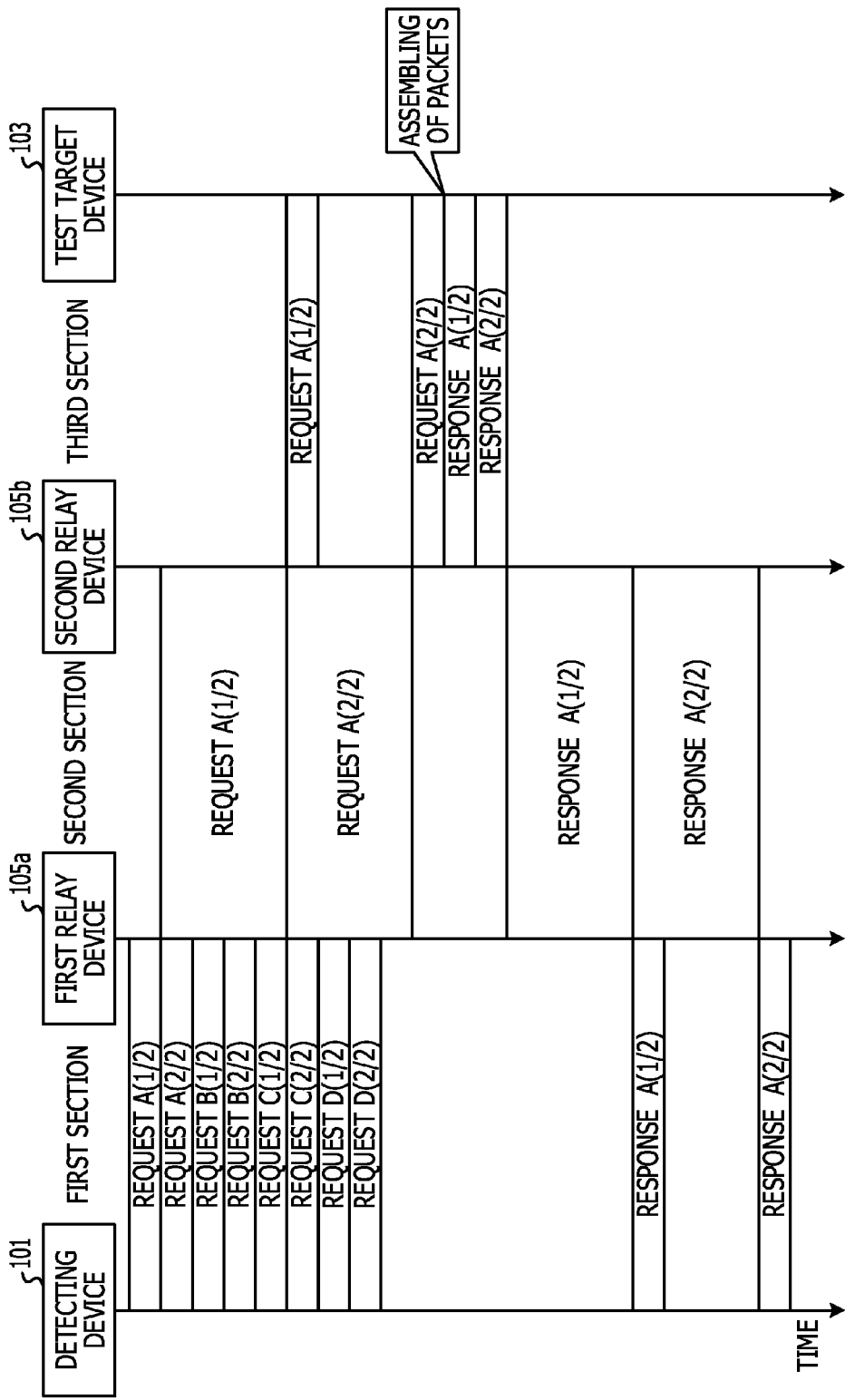
FIG. 9 illustrates a situation of data transmission.

FIG. 9 illustrates the situation of data transmission in a case where a mismatch exists in the first section. This diagram illustrates the situation of data transmission in the first section, the situation of data transmission in the second section, and the situation of data transmission in the third section.

In the same way as described above, each of axes in a downward direction indicates an elapsed time. A rectangle illustrated in a section indicates a transmission time of a packet in the corresponding section. Since communication is performed at low speed in the second section and communication is performed at high speed in the first section and the third section, each rectangle in the second section is larger than a corresponding rectangle in the first section and a corresponding rectangle in the third section.

In this example, one request message is divided into two packets. A rectangle indicated by "request A(1/2)" indicates a transmission time of the first packet out of two packets divided from the request message A. A rectangle indicated by "request A(2/2)" indicates a transmission time of the second packet out of the two packets divided from the request message A. A rectangle indicated by "request B(1/2)" indicates a transmission time of the first packet out of two packets divided from the request message B. A rectangle indicated by "request B(2/2)" indicates a transmission time of the second packet out of the two packets divided from the request message B. A rectangle indicated by "request C(1/2)" indicates a transmission time of the first packet out of two packets divided from a request message C. A rectangle indicated by "request C(2/2)" indicates a transmission time of the second packet out of the two packets divided from the request message C. A rectangle indicated by "request D(1/2)" indicates a transmission time of the first packet out of two packets divided from a request message D. A rectangle indicated by "request D(2/2)" indicates a transmission time of the second packet out of the two packets divided from the request message D. As described above, the four request messages are continuously sent out from the detecting device 101.

Packets having sequentially arrived at the first relay device 105a are sent out to the second section. In this regard, however, after a timing when the transmission of a packet previously sent out finishes, the first relay device 105a sends out a subsequent packet.

Packets having sequentially arrived at the second relay device 105b are sent out to the third section without waiting for the arrival of a subsequent packet. Therefore, the two packets divided from the request message A are transmitted with leaving a space therebetween.

After the arrival of a subsequent packet included in the same request message, the test target device 103 assembles packets, and reconstructs the request message. In addition, the test target device 103 divides again a response message equal to the reconstructed request message into two, and sequentially sends out the divided packets to the third section.

In the diagram, a rectangle indicated by "response A(1/2)" indicates a transmission time of the first packet out of two packets divided from the response message A. In the same way, a rectangle indicated by "response A(2/2)" indicates a transmission time of the second packet out of the two packets divided from the response message A.

In the third section, the rectangle indicated by "response A(1/2)" and the rectangle indicated by "response A(2/2)" are continuous with each other. In other words, the two packets divided from the response message A are transmitted in a state of being continuous. Note that since a mismatch does not exist in the third section in this example, a collision does not occur in the third section.

Packets, which have sequentially arrived at the second relay device 105b and relate to a response message, are sent out to the second section. In this regard, however, after a timing when the transmission of a packet previously sent out finishes, the second relay device 105b sends out a subsequent packet. Note that since a mismatch does not exist in the second section in this example, a collision does not occur in the second section.

Packets, which have sequentially arrived at the first relay device 105a and relate to a response message, are sent out to the first section without waiting for the arrival of a subsequent packet. At this time, a request message is not sent out from the detecting device 101. Accordingly, a collision does not occur in the first section.

In a case where high-speed communication is performed in a section located at a source-side end in the same way as in the first section in this example, in some cases a mismatch is not detected even if the mismatch exists in that section. Hereinafter, an example for detecting a mismatch in a high-speed communication section located at the source-side end will be described.

Figure 10:
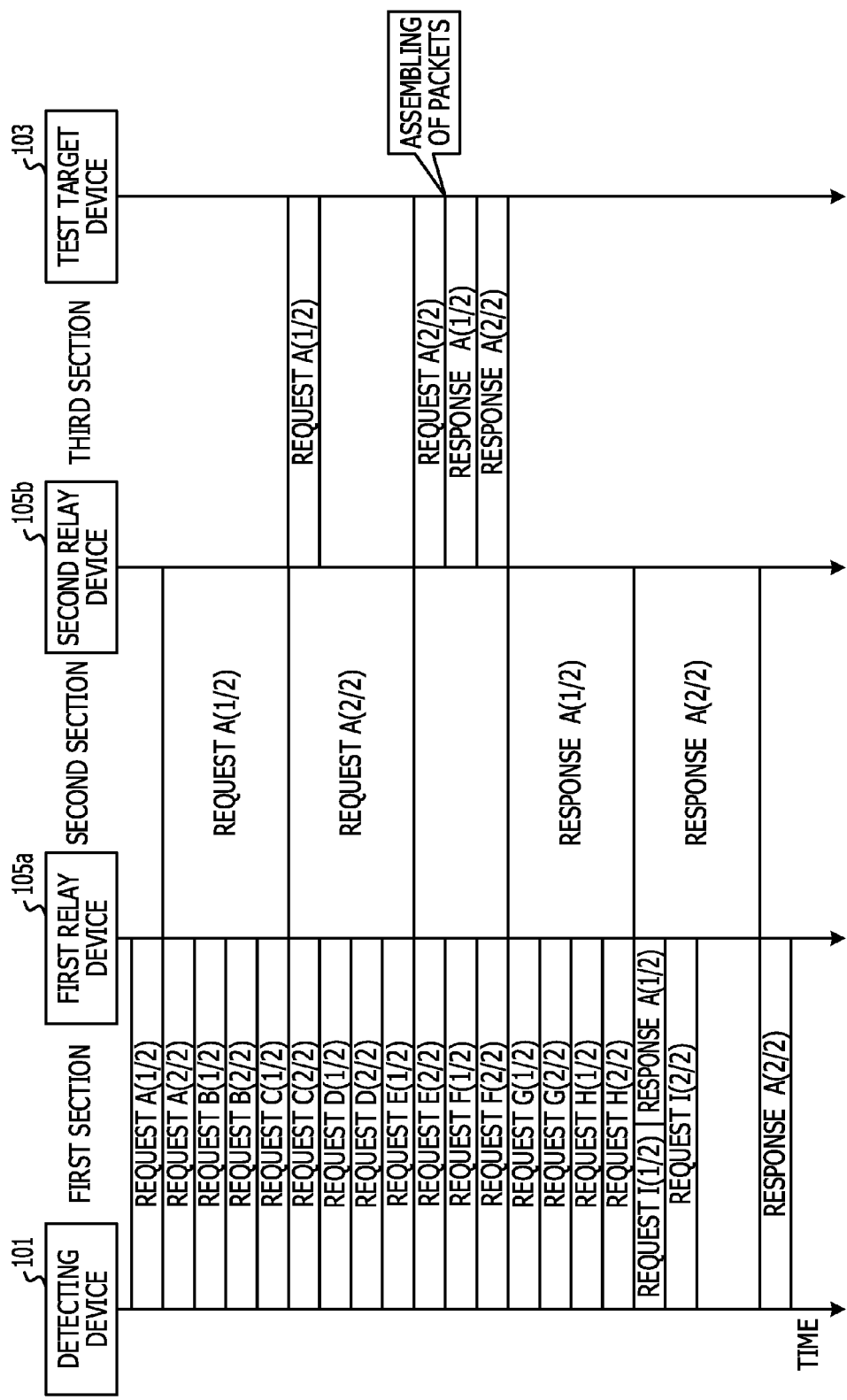
FIG. 10 illustrates a situation of data transmission.

FIG. 10 illustrates an example of sending out a large number of request messages from the detecting device 101. In the same way as described above, each of axes in a downward direction indicates an elapsed time. A rectangle illustrated in a section indicates a transmission time of a packet in the corresponding section. In the same way as FIG. 9, since communication is performed at low speed in the second section and communication is performed at high speed in the first section and the third section, each rectangle in the second section is larger than a corresponding rectangle in the first section and a corresponding rectangle in the third section.

In this example, one request message is divided into two packets. Packets of the request message A to the request message D are the same as in the case of FIG. 9.

In this example, a request message E to a request message I are sent out subsequent to the request message D. In the diagram, a rectangle indicated by "request E(1/2)" indicates a transmission time of the first packet out of two packets divided from the request message E. A rectangle indicated by "request E(2/2)" indicates a transmission time of the second packet out of the two packets divided from the request message E. A rectangle indicated by "request F(1/2)" indicates a transmission time of the first packet out of two packets divided from the request message F. A rectangle indicated by "request F(2/2)" indicates a transmission time of the second packet out of the two packets divided from the request message F. A rectangle indicated by "request G(1/2)" indicates a transmission time of the first packet out of two packets divided from the request message G. A rectangle indicated by "request G(2/2)" indicates a transmission time of the second packet out of the two packets divided from the request message G. A rectangle indicated by "request H(1/2)" indicates a transmission time of the first packet out of two packets divided from the request message H. A rectangle indicated by "request H(2/2)" indicates a transmission time of the second packet out of the two packets divided from the request message H. A rectangle indicated by "request I(1/2)" indicates a transmission time of the first packet out of two packets divided from the request message I. A rectangle indicated by "request I(2/2)" indicates a transmission time of the second packet out of the two packets divided from the request message I.

A situation where the request message A is transmitted in the second section and the third section is the same as in the case of FIG. 9. In addition, a situation where the response message A is transmitted in the third section and the second section is the same as in the case of FIG. 9.

As illustrated in FIG. 10, the transmission time of an initial packet of the response message A sent out from the first relay device 105a overlaps with the transmission time of an initial packet of the request message I sent out from the detecting device 101. Therefore, these two packets collide with each other, and are not normally transmitted.

That a packet loss in the high-speed communication section located at the source-side end occurs in this way leads to the detection of a mismatch in the high-speed communication section located at the source-side end.

Figure 11:
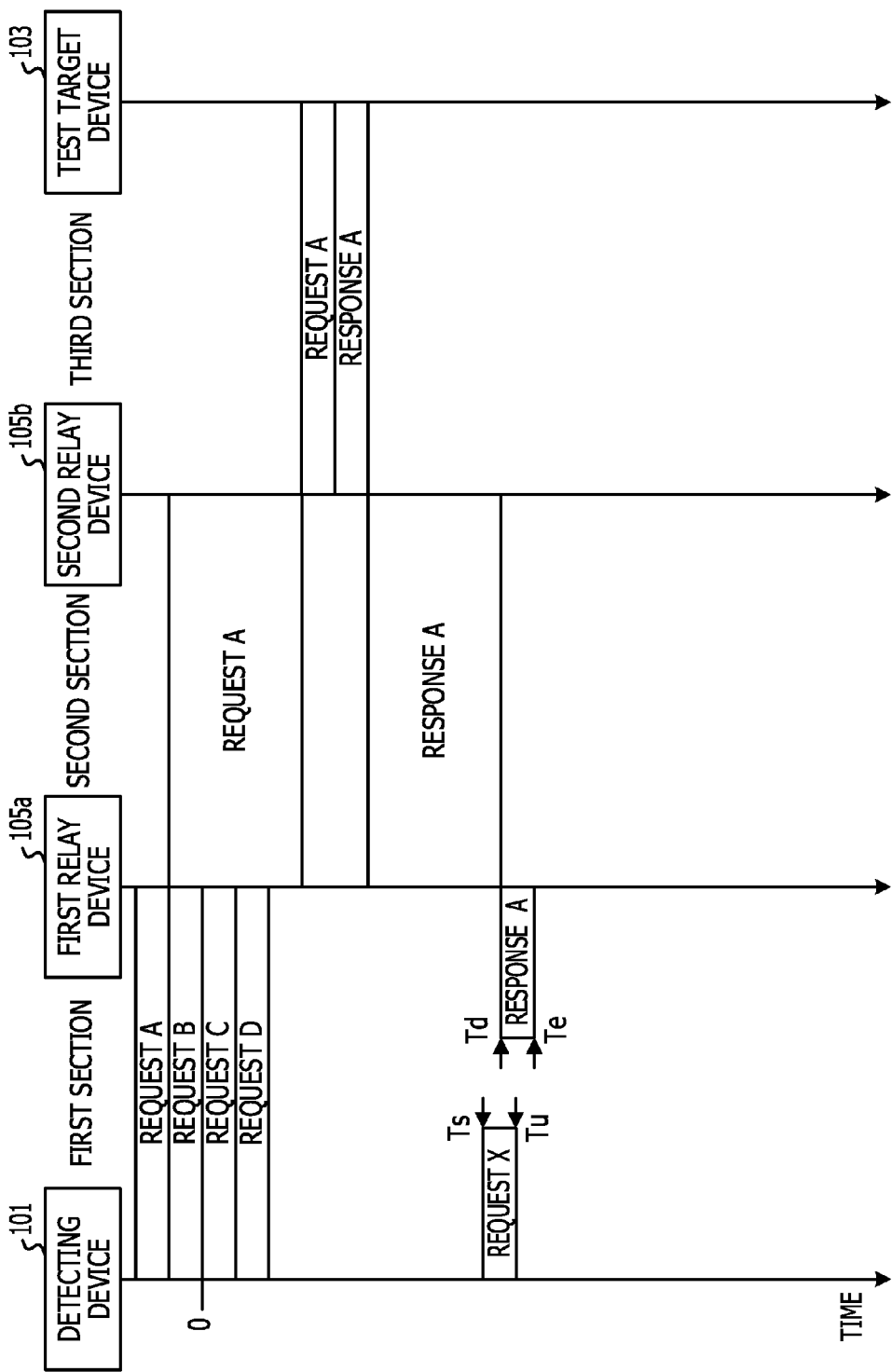
FIG. 11 is a diagram for explaining a condition where a loss occurs in a high-speed section on a source side.

Using FIG. 11, the condition of test data will be described that is used for detecting a mismatch in the high-speed communication section located at the source-side end. In this example, a test message is not divided. In other words, one packet corresponds to one test message. Hereinafter, the size of a packet is expressed by P.

In the same way as described above, each of axes in a downward direction indicates an elapsed time. A rectangle illustrated in a section indicates a transmission time of a packet in the corresponding section. In the same way as in FIG. 10, since communication is performed at low speed in the second section and communication is performed at high speed in the first section and the third section, each rectangle in the second section is larger than a corresponding rectangle in the first section and a corresponding rectangle in the third section.

Based on an elapsed time from a base point in time indicated by "0" in the diagram, a condition where a collision occurs will be derived. The base point in time indicates a timing when the transmission of the request message A has finished in the first section and the transmission of the request message B is started.

In accordance with the diagram, an elapsed time Tu relating to a request message is compared with an elapsed time Td relating to a response message. The elapsed time Tu is a time from the base point in time until the transmission of the m-th request message (expressed as "request X" in the diagram) finishes in the first section. The elapsed time Td is a time from the base point in time until the transmission of an initial response message (expressed as "response A" in the diagram) is started in the first section.

In addition, if the elapsed time Tu exceeds the elapsed time Td as illustrated in the following conditional expression (5), a collision occurs.

$$Tu > Td \qquad (5)$$

The elapsed time Tu corresponds to a time from the base point in time until the transmission of the m-th request message in the first section finishes. Therefore, by dividing the total size of "m−1" request messages is by the communication speed Ha in the first section, the elapsed time Tu is obtained. In the following, an expression (6) for deriving the elapsed time Tu is expressed.

$$Tu = (m-1)P/Ha \qquad (6)$$

On the other hand, the elapsed time Td corresponds to the total time of the transmission time of the request message A in the second section, the transmission time of the request message A in the third section, the transmission time of the response message A in the third section, and the transmission time of the response message A in the second section.

The transmission time of the request message A in the second section is obtained by dividing the size P of the packet by the communication speed L in the second section. The transmission time of the request message A in the third section is obtained by dividing the size P of the packet by the communication speed Hb in the third section. In addition, the transmission time of the response message A in the third section is obtained by dividing the size P of the packet by the communication speed Hb in the third section. The transmission time of the response message A in the second section is obtained by dividing the size P of the packet by the communication speed L in the second section.

Accordingly, the elapsed time Td is derived in accordance with the following expression (7).

$$Td=P/L+P/Hb+P/Hb+P/L=2P/L+2P/Hb \quad (7)$$

If the expression (6) and the expression (7) are substituted into the expression (5), the following conditional expression (8) is obtained.

$$(m-1)P/Ha>2P/L+2P/Hb \quad (8)$$

If, in response to the communication speed Ha in the first section, the communication speed L in the second section, and the communication speed Hb in the third section, m test messages each having the size P are sent out from the detecting device 101 so as to satisfy this conditional expression, a collision turns out to occur in the first section. In addition, under the premise that a condition where a collision occurs in the first section in this way is right, it is possible to verify the existence of a mismatch in the first section illustrated in FIG. 8.

Furthermore, in a case of being limited to a collision with the m-th request message (expressed as "request X" in the diagram), a condition is further added. An elapsed time Ts relating to a request message is compared with an elapsed time Te relating to a response message. The elapsed time Ts is a time from the base point in time until the transmission of the m-th request message (expressed as "request X" in the diagram) is started in the first section. The elapsed time Te is a time from the base point in time until the transmission of the first response message (expressed as "response A" in the diagram) finishes in the first section.

In addition, that the elapsed time Te exceeds the elapsed time Ts as illustrated in the following conditional expression (9) becomes the other condition.

$$Ts<Te \quad (9)$$

The elapsed time Ts corresponds to a time from the base point in time until the transmission of the m-1-th request message in the first section finishes. Therefore, by dividing the total size of "m-2" request messages by the communication speed Ha in the first section, the elapsed time Ts is obtained. In the following, an expression (10) for deriving the elapsed time Ts is expressed.

$$Ts=(m-2)P/Ha \quad (10)$$

On the other hand, the elapsed time Te corresponds to the total time of the elapsed time Td and the transmission time of the response message A in the first section. The transmission time of the response message A in the first section is obtained by dividing the size P of the packet by the communication speed Ha in the first section.

Accordingly, the elapsed time Te is derived in accordance with the following expression (11).

$$Te=Td+P/Ha=2P/L+2P/Hb+P/Ha \quad (11)$$

If the expression (10) and the expression (11) are substituted into the expression (9), the following conditional expression (12) is obtained.

$$(m-2)P/Ha<2P/L+2P/Hb+P/Ha \quad (12)$$

This is the end of the description of the detection condition in the case where a mismatch exists in the first section in which communication is performed at high speed.

In the above-mentioned examples, the detection of a mismatch in the network configuration in which high-speed communication is performed in the section located at the destination-side end and the section located at the source-side end has been described. From here, the detection of a mismatch in a network configuration in which high-speed communication is performed in a section located midway will be described.

Figure 12:
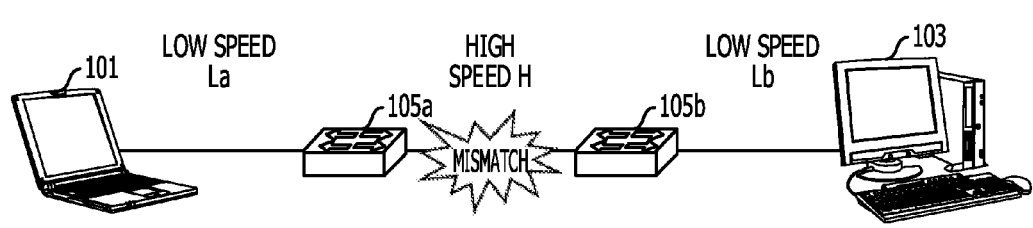
FIG. 12 illustrates an example of a mismatch section.

In an example illustrated in FIG. 12, the first section is connected using a WAN, and communication is performed therein at low speed. The second section is connected using a LAN, and communication is performed therein at high speed. The third section is connected using a WAN, and communication is performed therein at low speed. Hereinafter, in this example, a communication speed in the first section is expressed by La. In the same way, a communication speed in the second section is expressed by H. In the same way, a communication speed in the third section is expressed by Lb.

Figure 13:
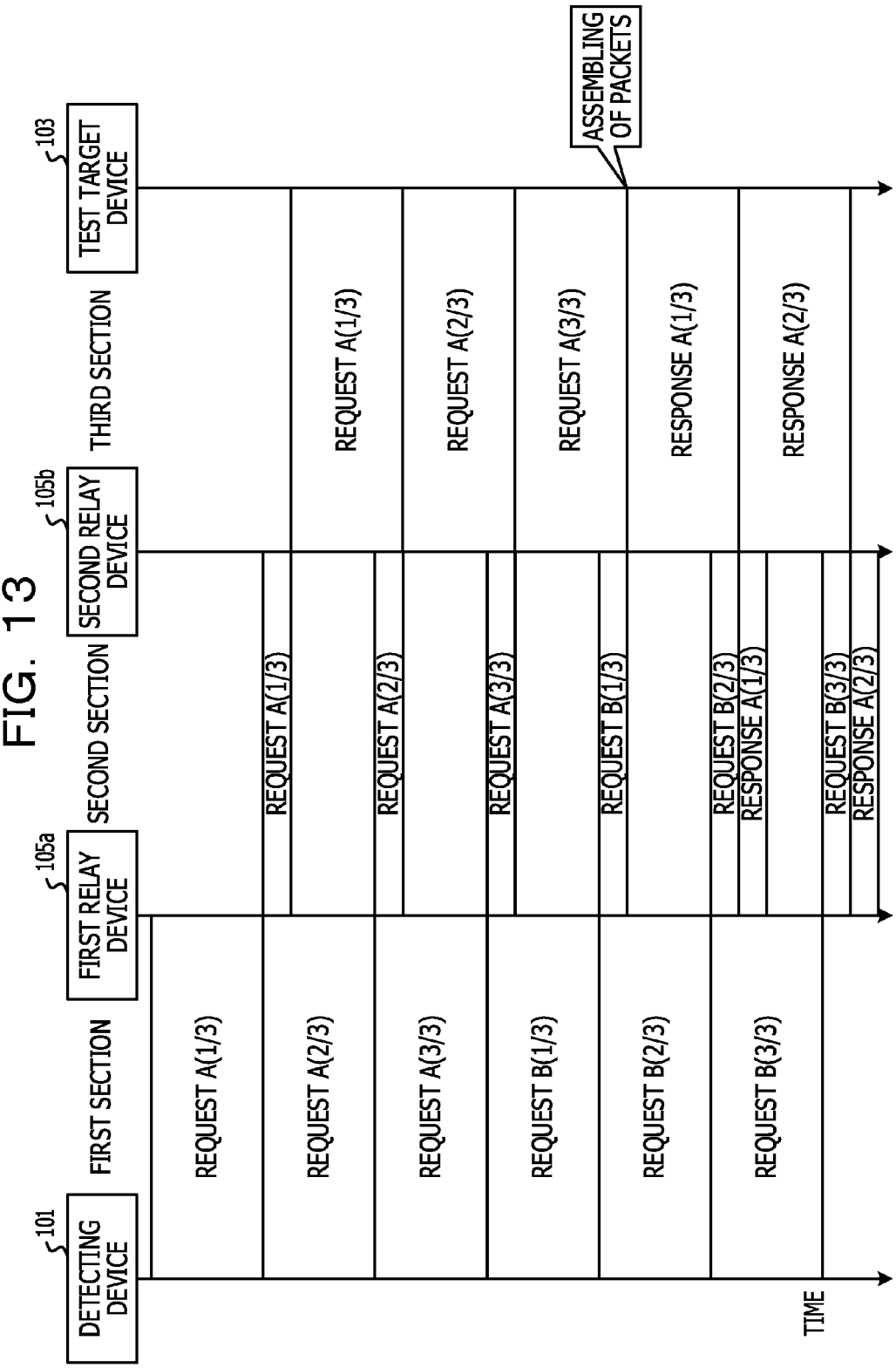
FIG. 13 illustrates a situation of data transmission.

FIG. 13 illustrates the situation of data transmission in a case where a mismatch exists in the second section. This diagram illustrates the situation of data transmission in the first section, the situation of data transmission in the second section, and the situation of data transmission in the third section.

In the same way as described above, each of axes in a downward direction indicates an elapsed time. A rectangle illustrated in a section indicates a transmission time of a packet in the corresponding section. Since communication is performed at high speed in the second section and communication is performed at low speed in the first section and the third section, each rectangle in the second section is smaller than a corresponding rectangle in the first section and a corresponding rectangle in the third section.

In this example, one request message is divided into three packets. A rectangle indicated by "request A(1/3)" indicates a transmission time of the first packet out of three packets divided from the request message A. A rectangle indicated by "request A(2/3)" indicates a transmission time of the second packet out of the three packets divided from the request message A. A rectangle indicated by "request A(3/3)" indicates a transmission time of the third packet out of the three packets divided from the request message A.

A rectangle indicated by "request B(1/3)" indicates a transmission time of the first packet out of three packets divided from the request message B. A rectangle indicated by "request B(2/3)" indicates a transmission time of the second packet out of the three packets divided from the request message B. A rectangle indicated by "request B(3/3)" indicates a transmission time of the third packet out of the three packets divided from the request message B. The three packets divided from the request message A and the three packets divided from the request message B are continuously sent out from the detecting device 101.

Packets having sequentially arrived at the first relay device 105a are sent out to the second section without waiting for the arrival of subsequent packets. Therefore, the three packets divided from the request message A and the three packets divided from the request message B are transmitted with leaving spaces therebetween.

Packets having sequentially arrived at the second relay device 105b are sent out to the third section. In this regard, however, after a timing when the transmission of a packet previously sent out finishes, the second relay device 105b sends out a subsequent packet.

After the arrival of subsequent packets included in the same request message, the test target device 103 assembles packets, and reconstructs the request message. In addition, the test target device 103 divides again a response message equal to the reconstructed request message into three, and sequentially sends out the divided packets to the third section.

In the diagram, a rectangle indicated by "response A(1/3)" indicates a transmission time of the first packet out of the three packets divided from the response message A. In the same way, a rectangle indicated by "response A(2/3)" indicates a transmission time of the second packet out of the three packets divided from the response message A.

In the third section, the rectangle indicated by "response A(1/3)" and the rectangle indicated by "response A(2/3)" are continuous with each other. While the third packet is omitted, the three packets divided from the response message A are transmitted in a state of being continuous. Note that since no mismatch exists in the third section in this example, no collision occurs in the third section.

Packets, which have sequentially arrived at the second relay device 105b and relate to a response message, are sent out to the second section without waiting for the arrival of subsequent packets. At this time, while a packet indicated by "request B(2/3)" and a packet indicated by "response A(1/3)" are transmitted in the second, the transmission times thereof do not overlap with each other. Accordingly, no collision occurs in the second section.

In a case where, in the same way as in the second section in this example, high-speed communication is performed in a section not located at the destination-side end or the source-side end, in other words, a section located midway, in some cases a mismatch is not detected even if existing in the section. Hereinafter, an example for detecting a mismatch in a high-speed communication section located midway will be described.

Figure 14:
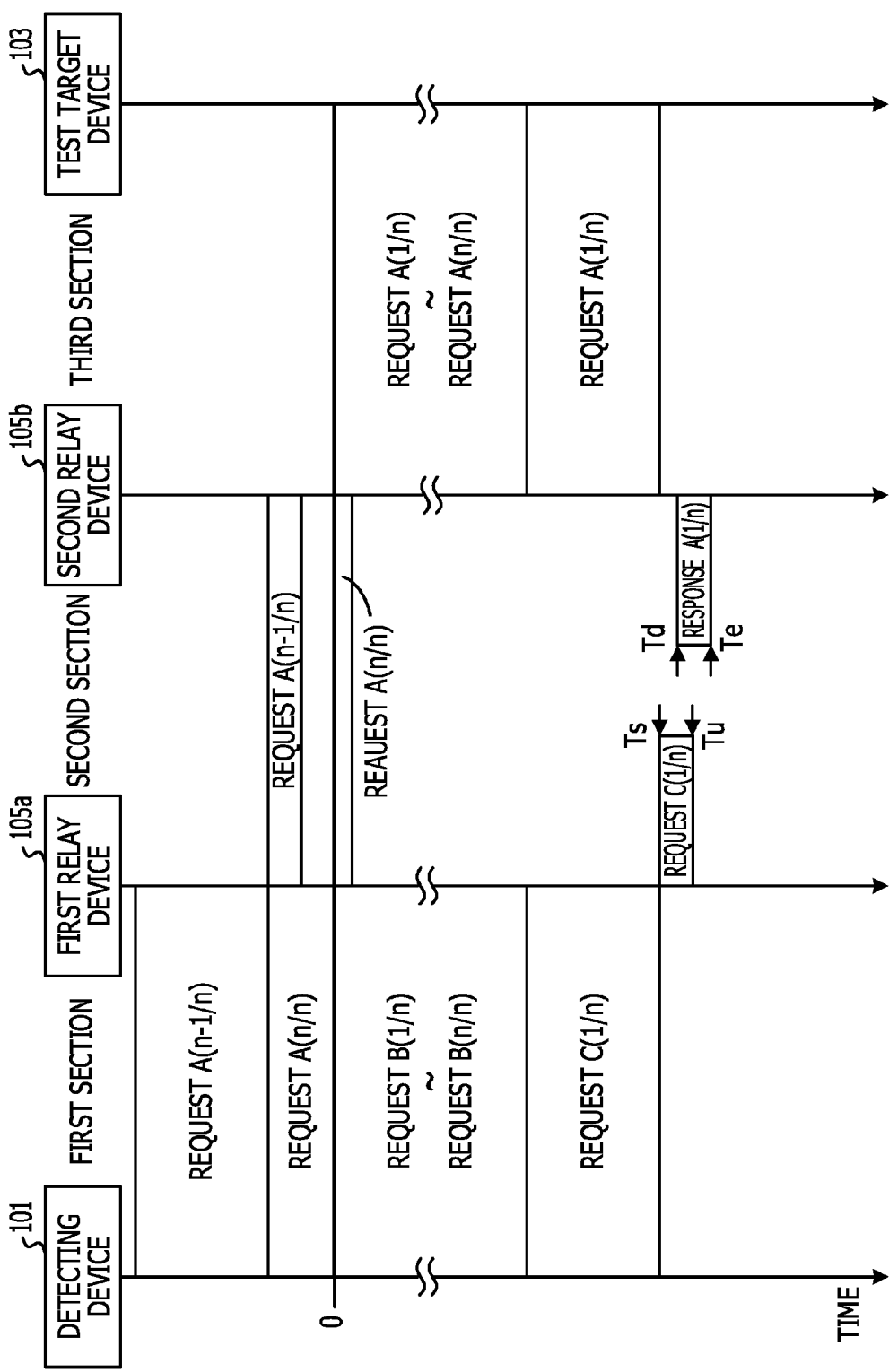
FIG. 14 is a diagram for explaining a condition where a loss occurs in a high-speed section located midway.

Using FIG. 14, the condition of test data will be described that is used for detecting a mismatch in the high-speed section located mid. This example is premised on the configuration of the test message illustrated in FIG. 6.

In the same way as described above, each of axes in a downward direction indicates an elapsed time. A rectangle illustrated in a section indicates a transmission time of a packet in the corresponding section. In the same way as in FIG. 13, since communication is performed at high speed in the second section and communication is performed at low speed in the first section and the third section, each rectangle in the second section is smaller than a corresponding rectangle in the first section and a corresponding rectangle in the third section.

Based on an elapsed time from a base point in time indicated by "0" in the diagram, a condition where a collision occurs will be derived. The base point in time indicates a timing when the transmission of the request message A has finished in the first section and the transmission of the request message B is started.

In accordance with the diagram, an elapsed time Tu relating to a request message is compared with an elapsed time Td relating to a response message, and furthermore, an elapsed time Ts relating to the request message is compared with an elapsed time Te relating to the response message.

From among the elapsed times relating to the request message, the elapsed time Ts is a time from the base point in time until the transmission of an initial packet of the request message C subsequent to the request message B is started in the first section. The elapsed time Tu is a time until the transmission of the initial packet of the request message C subsequent to the request message B finishes in the second section, subsequent to the elapsed time Ts.

From among the elapsed times relating to the response message, the elapsed time Td is a time from the base point in time until the transmission of the initial packet of the response message A is started in the second section. The elapsed time Te is a time from the base point in time until the transmission of the initial packet of the response message A finishes in the second section.

In this example, in a case of satisfying the following two conditions, a collision occurs. A first condition is that the elapsed time Tu exceeds the elapsed time Td. That conditional expression (13) is expressed in the following.

$$Tu > Td \tag{13}$$

In addition, a second condition is that the elapsed time Te exceeds the elapsed time Ts. That conditional expression (14) is expressed in the following.

$$Ts < Te \tag{14}$$

The elapsed time Ts corresponds to the transmission time of the entire request message B and the initial packet of the request message C in the first section. Therefore, by dividing the total size of the entire request message and the initial packet by the communication speed La in the first section, the elapsed time Ts is obtained. In the following, an expression (15) for deriving the elapsed time Ts is expressed.

$$Ts = ((n-1)P + Q + P)/La = (nP + Q)/La \tag{15}$$

The elapsed time Tu corresponds to a time obtained by adding the transmission time of the initial packet of the request message C in the second section to the elapsed time Ts. The transmission time of the initial packet of the request message C in the second section is obtained by dividing the size P of the initial packet by the communication speed H in the second section. Accordingly, the elapsed time Tu is derived in accordance with the following expression (16).

$$Tu = Ts + P/H = (nP + Q)/La + P/H \tag{16}$$

In addition, the elapsed time Td corresponds to the total time of the transmission time of the final packet of the request message A in the second section, the transmission time of the entire request message A in the third section, and the transmission time of the initial packet of the response message A in the third section.

The transmission time of the final packet of the request message A in the second section is obtained by dividing the size Q of the final packet by the communication speed H in the second section. The transmission time of the entire request message A in the third section is obtained by dividing the size (n−1)P+Q of the entire request message by the communication speed Lb in the third section. The transmission time of the initial packet of the response message A in the third section is obtained by dividing the size P of the initial packet by the communication speed Lb in the third section. Accordingly, the elapsed time Td is derived in accordance with the following expression (17).

$$Td=Q/H+((n-1)P+Q)/Lb+P/Lb=Q/H+(nP+Q)/Lb \quad (17)$$

The elapsed time Te corresponds to a time obtained by adding the transmission time of the initial packet of the response message A in the second section to the elapsed time Td. The transmission time of the initial packet of the response message A in the second section is obtained by dividing the size P of the initial packet by the communication speed H in the second section. Accordingly, the elapsed time Te is derived in accordance with the following expression (18).

$$Te=Td+P/H=Q/H+(nP+Q)/Lb+P/H=(P+Q)/H+(nP+Q)/Lb \quad (18)$$

If the expression (16) and the expression (17) are substituted into the expression (13), a first conditional expression (19) is obtained.

$$(nP+Q)/La+P/H>Q/H+(nP+Q)/Lb \quad (19)$$

If the expression (15) and the expression (18) are substituted into the expression (14), a second conditional expression (20) is obtained.

$$(nP+Q)/La<(P+Q)/H+(nP+Q)/Lb \quad (20)$$

If, in response to the communication speed La in the first section, the communication speed H in the second section, and the communication speed Lb in the third section, at least three test messages are sent out so as to satisfy the conditional expressions, a collision turns out to occur in the second section. In addition, under the premise that a condition where a collision occurs in the second section in this way is right, it is possible to verify the existence of a mismatch in the second section illustrated in FIG. 12. This is the end of the description of the detection condition in the case where a mismatch exists in the second section in which communication is performed at high speed.

Figure 15:
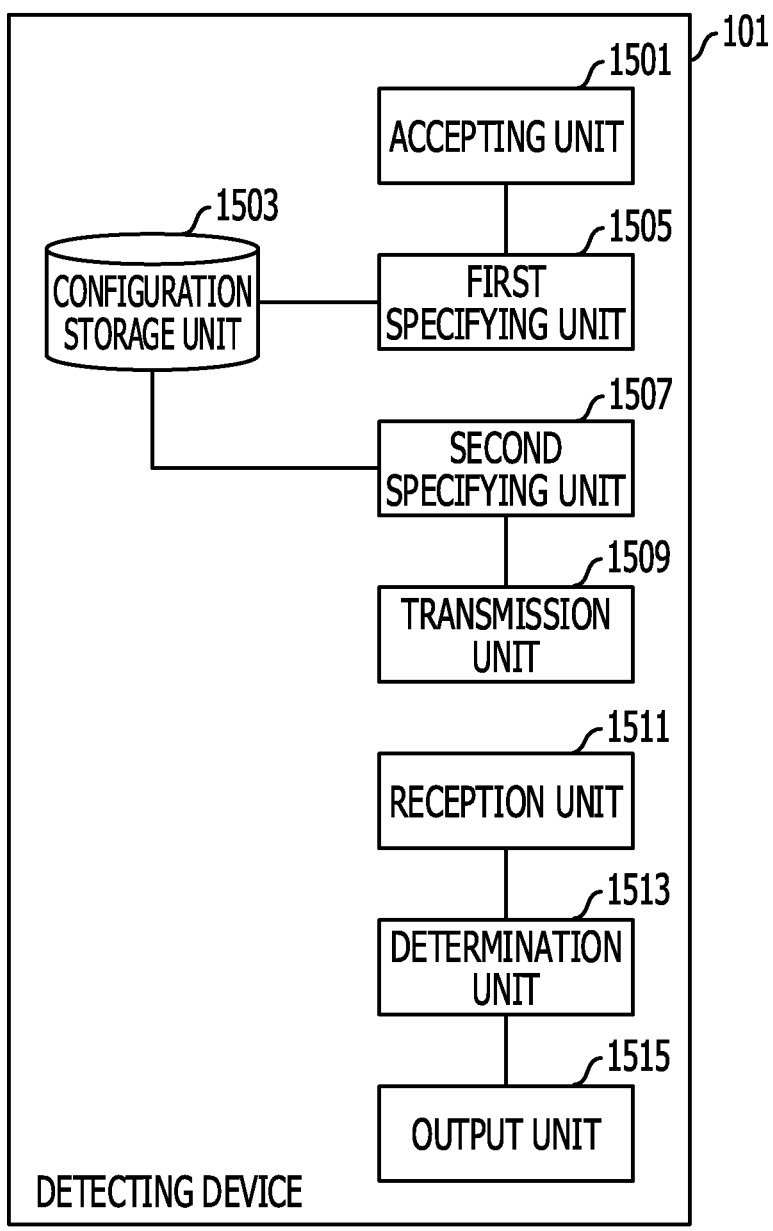
FIG. 15 illustrates an example of a module configuration of a detecting device.

From here, the detecting device 101 detecting a mismatch, based on the above-mentioned condition, will be described. FIG. 15 illustrates an example of the module configuration of the detecting device 101. The detecting device 101 includes an accepting unit 1501, a configuration storage unit 1503, a first specifying unit 1505, a second specifying unit 1507, a transmission unit 1509, a reception unit 1511, a determination unit 1513, and an output unit 1515. The accepting unit 1501 accepts data relating to a transmission path to serve as a test target. The configuration storage unit 1503 stores therein a configuration pattern conceivable as a transmission path, and so forth. The first specifying unit 1505 specifies the configuration pattern of a transmission path to serve as a test target. The second specifying unit 1507 specifies the configuration of test data. The transmission unit 1509 transmits the test data to the transmission path. The reception unit 1511 receives the test data from the transmission path. Based on the loss situation of the received test data, the determination unit 1513 determines a Duplex mismatch within the transmission path. The output unit 1515 outputs a determination result.

FIG. 16 illustrates an example of a configuration pattern table. The configuration pattern table includes a record used for specifying a configuration pattern. The record includes a field used for setting the number of sections and the communication speeds of the individual sections. In this regard, however, as for the communication speeds set here, the communication speeds in the individual sections are illustrated with being classified into a high speed and a low speed. For example, the high speed corresponds to the communication speed of the LAN and the low speed corresponds to the communication speed of the WAN. That is sufficient for comparing the communication speeds in the individual sections with each other.

In this example, a first configuration pattern specified by a first record indicates that a transmission path includes three sections and the communication speed of the first section is a high speed, the communication speed of the second section is a low speed, and the communication speed of the third section is a high speed, in order from the section closer to the detecting device 101. A second configuration pattern specified by a second record indicates that a transmission path includes three sections and the communication speed of the first section is a low speed, the communication speed of the second section is a high speed, and the communication speed of the third section is a low speed, in order from the section closer to the detecting device 101.

Figure 17:
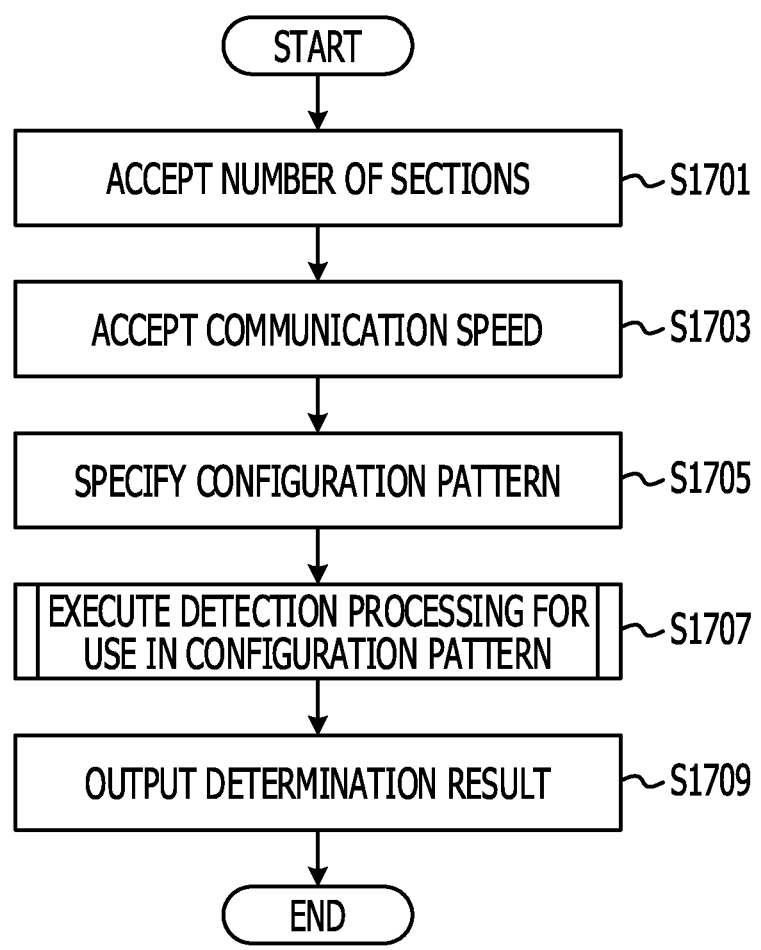
FIG. 17 illustrates a main flow in the detecting device.

FIG. 17 illustrates the main flow of processing in the detecting device 101. The accepting unit 1501 accepts the number of sections (S1701). For example, the number of sections input through an input device is accepted.

The accepting unit 1501 accepts a communication speed in each section (S1703). Here, a specific communication speed is accepted. Using the specific communication speed, a configuration pattern is specified and the above-mentioned conditional expressions are determined.

Alternatively, the accepting unit 1501 accepts a rough distinction between a high speed and a low speed, and furthermore, accepts ratios between communication speeds in individual sections. In this case, a configuration pattern is specified based on a distinction between a high speed and a low speed, and the above-mentioned conditional expressions are determined using the ratios between communication speeds.

Based on the pieces of data accepted in S1701 and S1703, the first specifying unit 1505 specifies the configuration pattern of a transmission path serving as a test target (S1705).

In addition, the detecting device 101 executes detection processing according to each configuration pattern (S1707).

First, detection processing corresponding to the first configuration pattern will be described, and detection processing corresponding to the second configuration pattern will be subsequently described.

Using FIG. 18, a summary of determination in the first configuration pattern will be described. For example, the above-mentioned configurations in FIG. 2 and FIG. 8 correspond to the first configuration pattern.

A test system for the above-mentioned case of FIG. 2 is referred to as a third high-speed system. A test system for the above-mentioned case of FIG. 8 is referred to as a first high-speed system. Note that a second high-speed system will be described later in determination in the second configuration pattern.

In addition, a test based on a usual system is also performed, the usual system not corresponding to the first high-speed system or the third high-speed system. The usual system is a test system for a low-speed section.

In the determination in the first configuration pattern, the above-mentioned three tests are performed. In addition, based on four determination patterns, the presence or absence of a mismatch in each section is determined. The four determination patterns will be described in order.

In the first determination pattern, in a case where no loss of test data is detected in the test of the usual system, the test of the third high-speed system, and the test of the first high-speed system, a determination result is set to "no mismatch exists in any one of sections".

In the second determination pattern, in a case where a loss of test data is detected in the test of the usual system, a determination result is set to "a mismatch exists in the second section". Note that no result in the test of the third high-speed system and no result in the test of the first high-speed system are involved in a determination result, in the second determination pattern.

In the third determination pattern, in a case where no loss of test data is detected in the test of the usual system, and a loss of test data is detected in the test of the third high-speed system, and no loss of test data is detected in the test of the first high-speed system, a determination result is set to "a mismatch exists in the third section". It is assumed that the third determination pattern satisfies the condition of a collision described in FIG. 7.

In the fourth determination pattern, in a case where no loss of test data is detected in the test of the usual system and the test of the third high-speed system and a loss of test data is detected in the test of the first high-speed system, a determination result is set to "a mismatch exists in the first section". It is assumed that the fourth determination pattern satisfies the condition of a collision described in FIG. 11.

Note that here an example is illustrated where no loss of test data occurs in the test of the first high-speed system in a case in which a loss of test data is detected in the test of the third high-speed system. In addition, an example is illustrated where no loss of test data occurs in the test of the third high-speed system in a case in which a loss of test data is detected in the test of the first high-speed system. In this regard, however, in a case where a loss of test data is detected in the test of the third high-speed system and furthermore a loss of test data is detected in the test of the first high-speed system, it may be determined that a mismatch exists in the third section or the first section. Alternatively, it may be determined that mismatches exist in the third section and the first section. This is the end of the description of the summary of the determination in the first configuration pattern.

Figure 19:
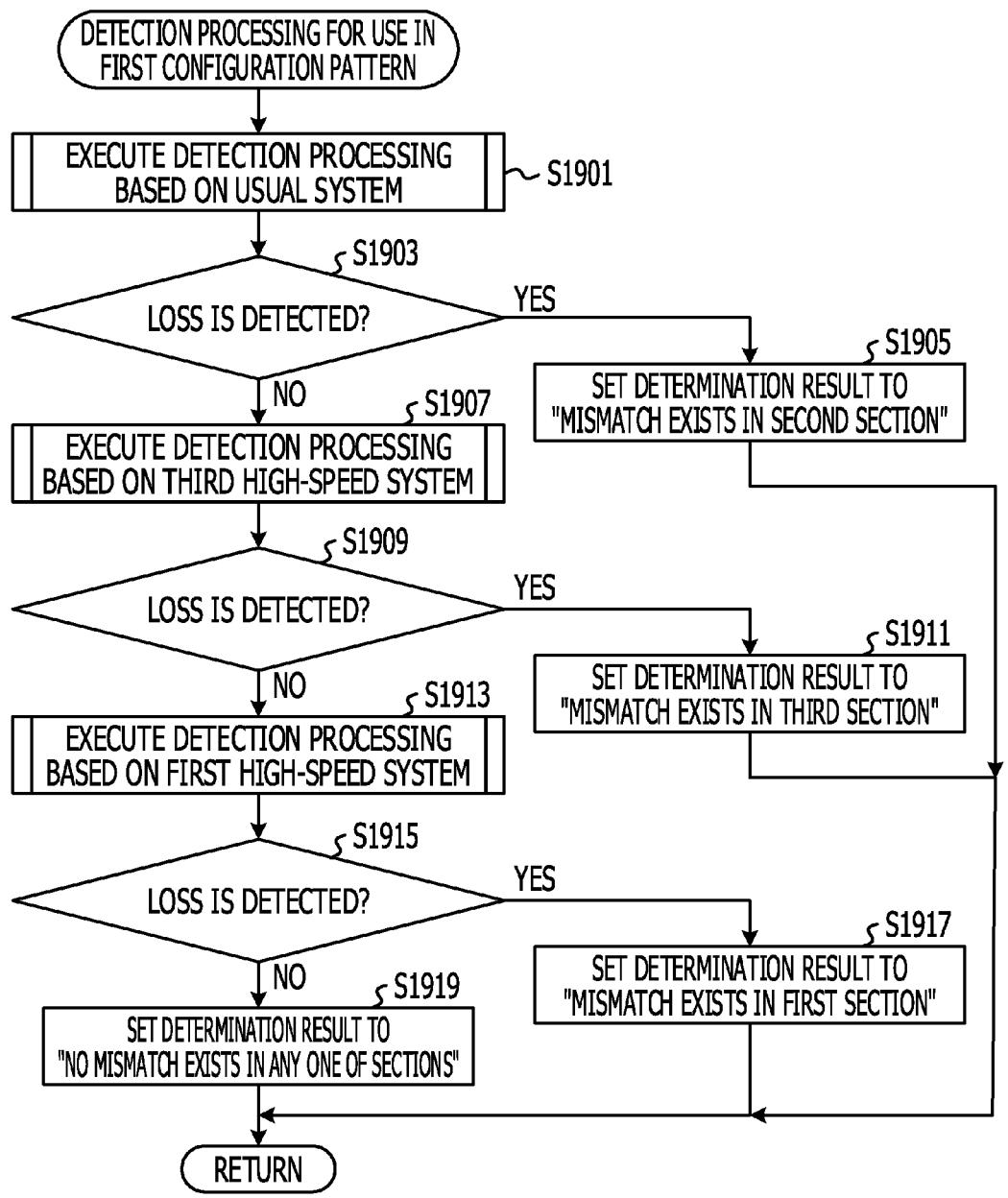
FIG. 19 illustrates a detection processing flow for use in a first configuration pattern.

Subsequently, detection processing according to the summary of the determination in the above-mentioned first configuration pattern will be described. FIG. 19 illustrates a detection processing flow for use in the first configuration pattern. First, the detecting device 101 executes detection processing based on the usual system (S1901).

Figure 20:
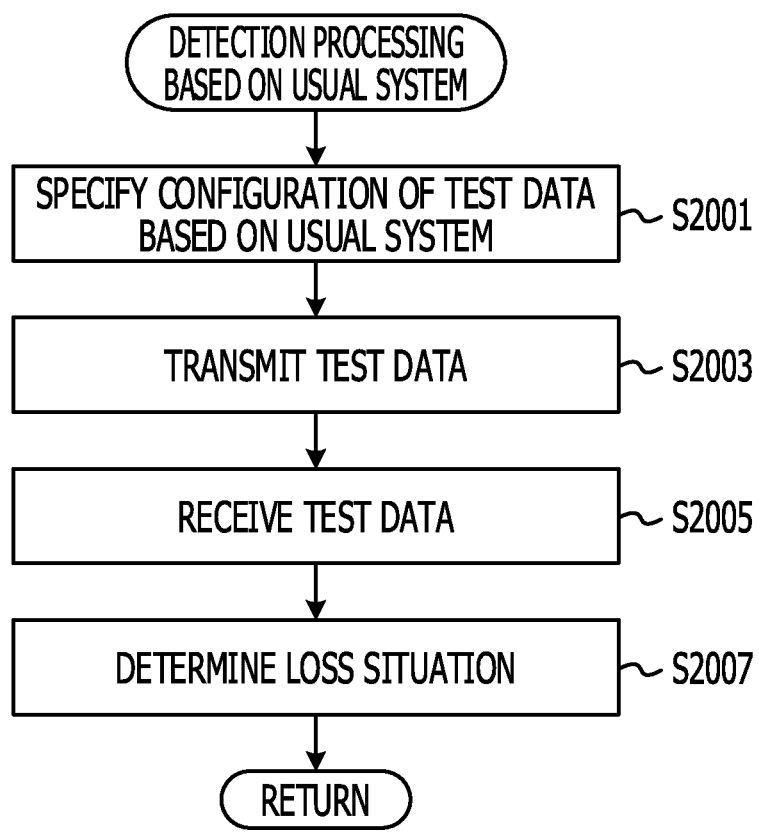
FIG. 20 illustrates a detection processing flow based on a usual system.

FIG. 20 illustrates a detection processing flow based on the usual system. The second specifying unit 1507 specifies the configuration of test data based on the usual system (S2001). The configuration of test data based on the usual system is a continuous test message, and corresponds to test data of the related art causing a collision to occur in a section in which low-speed communication is performed. In addition, the configuration of test data based on the usual system does not correspond to the configuration of test data in the third high-speed system, and furthermore, does not correspond to the configuration of test data in the first high-speed system.

In accordance with the specified configuration, the transmission unit 1509 transmits test data to the test target device 103 through a transmission path (S2003). At this time, there is issued an instruction to divide a return response message into packets and transmit the packets after packets included in a request message have been assembled in the test target device 103.

The reception unit 1511 receives test data from the transmission path (S2005). The test data received at this time is packets having arrived without being lost. All or part of the response message has disappeared in some cases.

The determination unit 1513 determines a loss situation (S2007). For example, the ratio of the number of received packets to the number of packets transmitted as the test data is calculated, and it is determined whether or not the ratio (referred to as a loss rate) exceeds a predetermined threshold value. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S1903 illustrated in FIG. 19.

Returning to the description of the detection processing flow for use in the first configuration pattern illustrated in FIG. 19, the determination unit 1513 branches the processing, based on whether a loss is detected or not, in other words, the above-mentioned status is "detection of a loss" or "detection of no loss" (S1903).

In a case of detecting a loss, the determination unit 1513 sets a determination result to "a mismatch exists in the second section" (S1905). This processing corresponds to the above-mentioned second determination pattern. In addition, the detection processing for use in the first configuration pattern finishes, and the processing returns to a processing operation in S1709 illustrated in FIG. 17.

On the other hand, in a case of detecting no loss, the detecting device 101 executes detection processing based on the third high-speed system (S1907).

Figure 21:
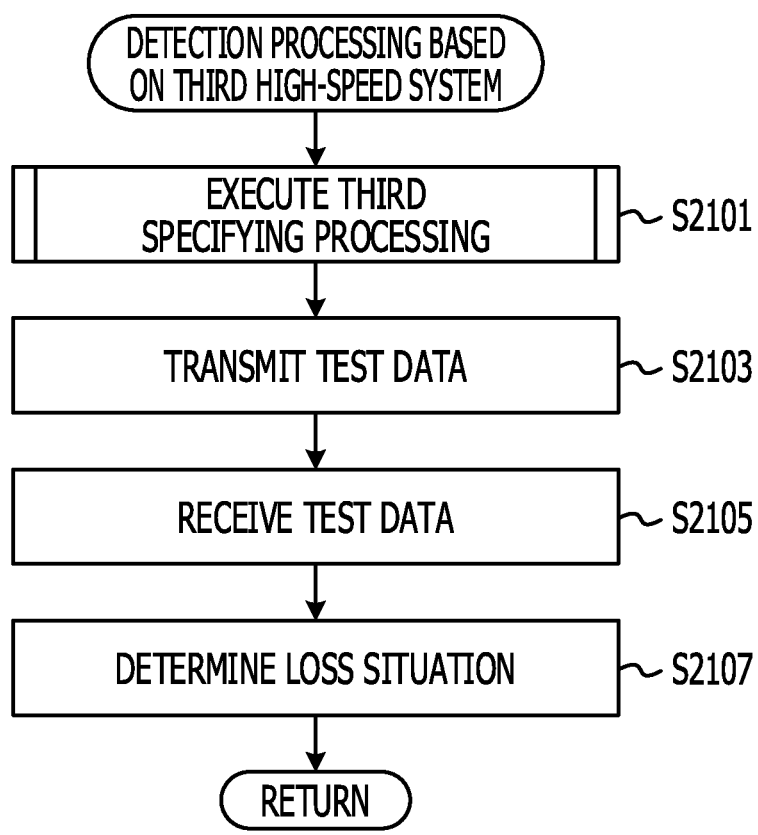
FIG. 21 illustrates a detection processing flow based on a third high-speed system.

FIG. 21 illustrates a detection processing flow based on the third high-speed system. As described above, the third high-speed system is based on the condition of a collision illustrated in FIG. 7.

The second specifying unit 1507 executes third specifying processing (S2101). In the third specifying processing, the configuration of test data based on the third high-speed system is specified. Here, examples of third specifying processing A, third specifying processing B, and third specifying processing C are illustrated.

Figure 22:
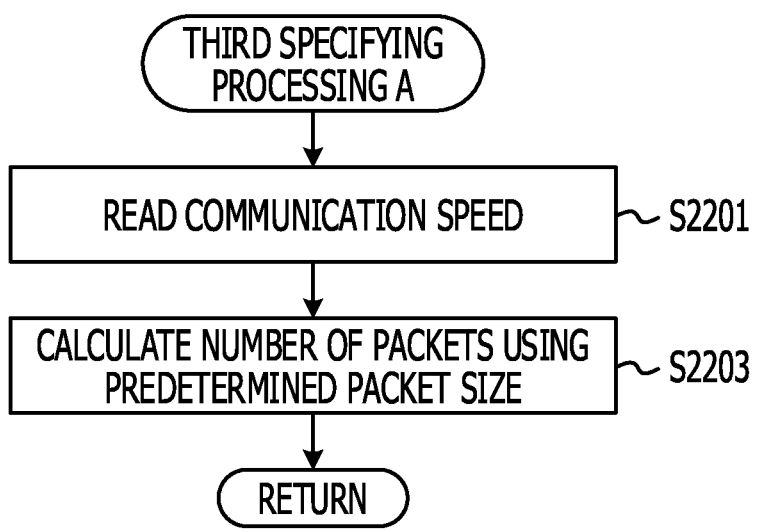
FIG. 22 illustrates a flow of third specifying processing A.

FIG. 22 illustrates the flow of the third specifying processing A. In this processing, a preliminarily set packet size is used. The second specifying unit 1507 reads a communication speed in each section from the configuration storage unit 1503 (S2201). In accordance with the above-mentioned expression (4), the second specifying unit 1507 calculates the number of packets using a predetermined packet size (S2203).

If, in the above-mentioned expression (4), the packet size P, the packet size Q, the communication speed L in the second section, and the communication speed Hb in the third section are defined, the range of the number n of packets is specified. The second specifying unit 1507 calculates the number n of packets larger than a value. In addition, the processing returns to a processing operation in S2103 illustrated in FIG. 21.

Figure 23:
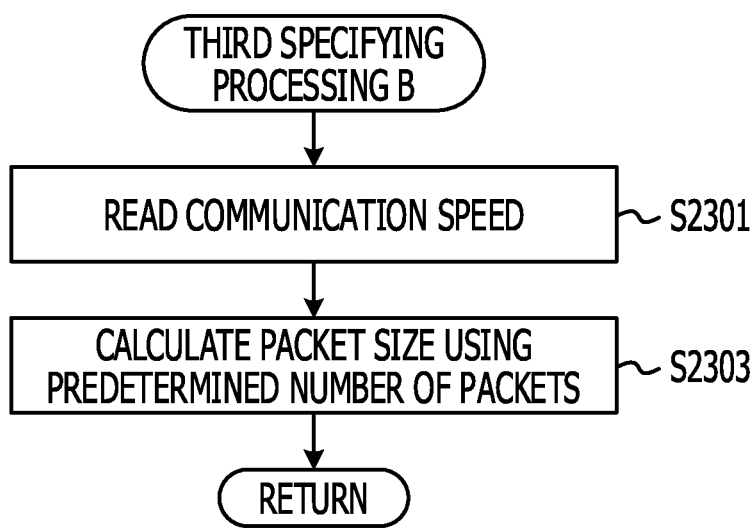
FIG. 23 illustrates a flow of third specifying processing B.

FIG. 23 illustrates the flow of the third specifying processing B. In this processing, the preliminarily set number of packets are used. The second specifying unit 1507 reads a communication speed in each section from the configuration storage unit 1503 (S2301). In accordance with the above-mentioned expression (4), the second specifying unit 1507 calculates a packet size using the predetermined number of packets (S2303).

If, in the above-mentioned expression (4), the number n of packets, the communication speed L in the second section, and the communication speed Hb in the third section are defined, the range of a ratio between the packet size P and the packet size Q is defined. The second specifying unit 1507 calculates the packet size P and the packet size Q so that a ratio Q/P larger than a value is obtained. In addition, the processing returns to the processing operation in S2103 illustrated in FIG. 21.

Figure 24:
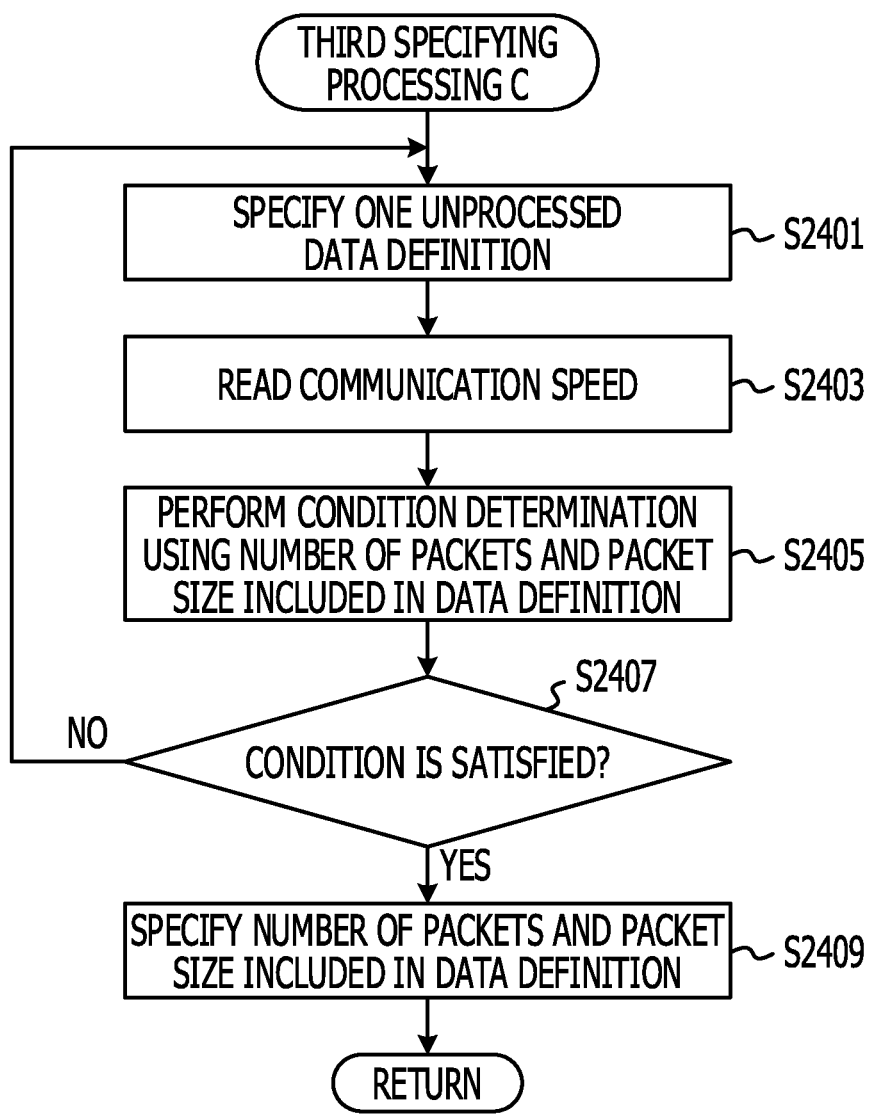
FIG. 24 illustrates a flow of third specifying processing C.

FIG. 24 illustrates the flow of the third specifying processing C. In this processing, a plurality of data definitions to serve as candidates are preliminarily registered in the configuration storage unit 1503. In addition, the second specifying unit 1507 specifies one of these data definitions, which satisfies a condition.

The second specifying unit 1507 specifies one unprocessed data definition (S2401). The second specifying unit 1507 reads a communication speed in each section from the configuration storage unit 1503 (S2403). Using the number of packets and a packet size included in the corresponding data definition, the second specifying unit 1507 performs condition determination for the above-mentioned expression (4) (S2405).

Based on the data definition, the second specifying unit 1507 specifies the packet size P, the packet size Q, and the number n of packets. In addition, based on the packet size P, the packet size Q, the number n of packets, the communication speed L in the second section, and the communication speed Hb in the third section, the second specifying unit 1507 determines whether or not the expression (4) is satisfied.

The second specifying unit 1507 determines whether or not the above-mentioned condition is satisfied (S2407). In a case of determining that the above-mentioned condition is satisfied, the second specifying unit 1507 specifies the number of packets and a packet size included in the data definition (S2409). In addition, the processing returns to the processing operation in S2103 illustrated in FIG. 21.

On the other hand, in a case of determining that the above-mentioned condition is not satisfied, the second specifying unit 1507 returns to the processing operation in S2401, and repeats a series of processing operations. This is the end of the description of the third specifying processing.

Returning to the processing illustrated in FIG. 21, the transmission unit 1509 transmits test data to the test target device 103 through the transmission path, in accordance with the specified configuration (S2103). At this time, there is issued an instruction to divide a return response message into packets and transmit the packets after packets included in a request message have been assembled in the test target device 103.

The reception unit 1511 receives test data from the transmission path (S2105). As described above, the test data received at this time is packets having arrived without being lost. All or part of the response message has disappeared in some cases.

The determination unit 1513 determines a loss situation (S2107). For example, in the same way as in S2007, the ratio of the number of received packets to the number of packets transmitted as the test data is calculated, and it is determined whether or not the ratio (referred to as a loss rate) exceeds a predetermined threshold value. In this regard, however, the predetermined threshold value may be the same as in the case of S2007 and different therefrom. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S1909 illustrated in FIG. 19.

Returning to the description of the detection processing flow for use in the first configuration pattern illustrated in FIG. 19, the determination unit 1513 branches the processing, based on whether a loss is detected or not, in other words, the above-mentioned status is "detection of a loss" or "detection of no loss" (S1909).

In a case of detecting a loss, the determination unit 1513 sets a determination result to "a mismatch exists in the third section" (S1911). This processing corresponds to the above-mentioned third determination pattern. In addition, the detection processing for use in the first configuration pattern finishes, and the processing returns to the processing operation in S1709 illustrated in FIG. 17.

On the other hand, in a case of detecting no loss, the detecting device 101 executes detection processing based on the first high-speed system (S1913).

Figure 25:
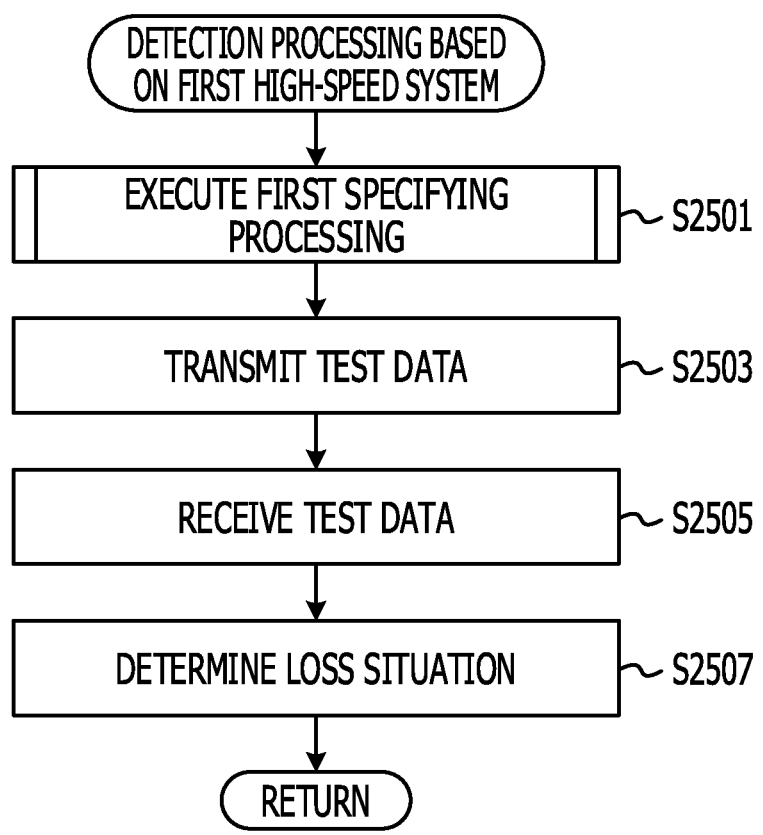
FIG. 25 illustrates a detection processing flow based on a first high-speed system.

FIG. 25 illustrates a detection processing flow based on the first high-speed system. As described above, the first high-speed system is based on the condition of a collision illustrated in FIG. 11.

The second specifying unit 1507 executes first specifying processing (S2501). In the first specifying processing, the configuration of test data based on the first high-speed system is specified. Here, examples of first specifying processing A and first specifying processing B are illustrated.

Figure 26:
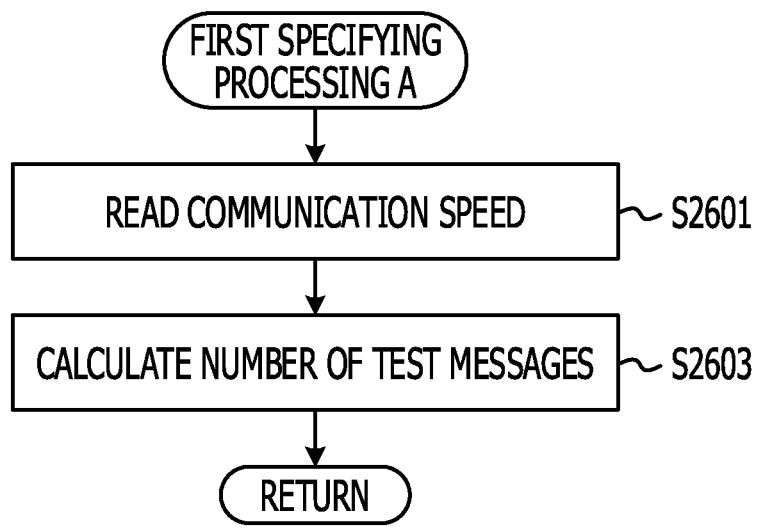
FIG. 26 illustrates a flow of first specifying processing A.

FIG. 26 illustrates the flow of the first specifying processing A. In the processing, the number of test messages is calculated based on a communication speed in each section. The second specifying unit 1507 reads a communication speed in each section from the configuration storage unit 1503 (S2601). In accordance with the above-mentioned expression (8), the second specifying unit 1507 calculates the number of test messages (S2603).

If, in the above-mentioned expression (8), the packet size P, the communication speed Ha in the first section, the communication speed L in the second section, and the communication speed Hb in the third section are defined, the range of the number m of test messages is specified. The second specifying unit 1507 calculates the number m of test messages larger than a value. Note that a ratio between the communication speed Ha in the first section and the communication speed L in the second section, a ratio between the communication speed Ha in the first section and the communication speed Hb in the third section, or a ratio between the communication speed L in the second section and the communication speed Hb in the third section may be used. In addition, the processing returns to a processing operation in S2503 illustrated in FIG. 25.

Figure 27:
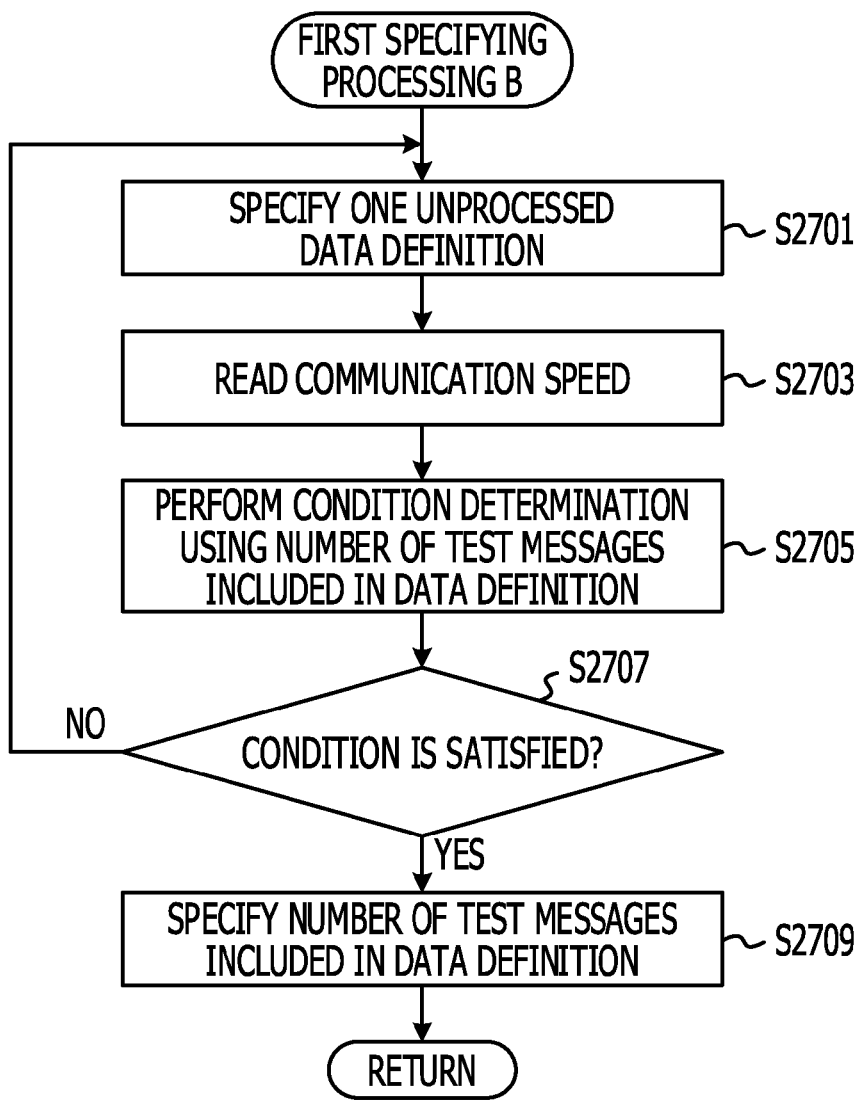
FIG. 27 illustrates a flow of first specifying processing B.

FIG. 27 illustrates the flow of the first specifying processing A. In this case, a plurality of data definitions to serve as candidates are preliminarily registered in the configuration storage unit 1503. In addition, the second specifying unit 1507 specifies one of these data definitions, which satisfies a condition.

The second specifying unit 1507 specifies one unprocessed data definition (S2701). The second specifying unit 1507 reads a communication speed in each section from the configuration storage unit 1503 (S2703). Using the packet size P and the number m of test messages included in the corresponding data definition, the second specifying unit 1507 performs condition determination for the above-mentioned expression (8) (S2705).

Based on the data definition, the second specifying unit 1507 specifies the packet size P and the number m of test messages. In addition, based on the packet size P, the number m of test messages, the communication speed Ha in the first section, the communication speed L in the second section, and the communication speed Hb in the third section, the second specifying unit 1507 determines whether or not the expression (8) is satisfied. Note that a ratio between the communication speed Ha in the first section and the communication speed L in the second section, a ratio between the communication speed Ha in the first section and the communication speed Hb in the third section, or a ratio between the communication speed L in the second section and the communication speed Hb in the third section may be used.

The second specifying unit 1507 determines whether or not the above-mentioned condition is satisfied (S2707). In a case of determining that the above-mentioned condition is satisfied, the second specifying unit 1507 specifies the packet size P and the number m of test messages included in the corresponding data definition (S2709). In addition, the processing returns to the processing operation in S2503 illustrated in FIG. 25.

On the other hand, in a case of determining that the above-mentioned condition is not satisfied, the second specifying unit 1507 returns to the processing operation in S2701, and repeats a series of processing operations. This is the end of the description of the first specifying processing.

Returning to the processing illustrated in FIG. 25, the transmission unit 1509 transmits test data to the test target device 103 through the transmission path, in accordance with the specified configuration (S2503). At this time, there is issued an instruction to divide a return response message into packets and transmit the packets after packets included in a request message have been assembled in the test target device 103.

The reception unit 1511 receives test data from the transmission path (S2505). As described above, the test data received at this time is packets having arrived without being lost. All or part of the response message has disappeared in some cases.

The determination unit 1513 determines a loss situation (S2507). For example, in the same way as in S2007 or S2107, the ratio of the number of received packets to the number of packets transmitted as the test data is calculated, and it is determined whether or not a loss rate exceeds a predetermined threshold value. In this regard, however, the predetermined threshold value may be the same as in S2007 or S2107 and different therefrom. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S1915 illustrated in FIG. 19.

Returning to the description of the detection processing flow for use in the first configuration pattern illustrated in FIG. 19, the determination unit 1513 branches the processing, based on whether a loss is detected or not, in other words, the above-mentioned status is "detection of a loss" or "detection of no loss" (S1915).

In a case of detecting a loss, the determination unit 1513 sets a determination result to "a mismatch exists in the first section" (S1917). This processing corresponds to the above-mentioned fourth determination pattern. In addition, the detection processing for use in the first configuration pattern finishes, and the processing returns to the processing operation in S1709 illustrated in FIG. 17.

On the other hand, in a case of detecting no loss, the determination unit 1513 sets a determination result to "no mismatch exists in any one of sections" (S1919). This processing corresponds to the above-mentioned first determination pattern. In addition, the detection processing for use in the first configuration pattern finishes, and the processing returns to the processing operation in S1709 illustrated in FIG. 17.

Returning to the description of the main processing flow illustrated in FIG. 17, the output unit 1515 outputs a determination result (S1709).

Subsequently, a case of specifying the second configuration pattern in S1705 will be described. Using FIG. 28, a summary of determination in the second configuration pattern will be described. For example, the above-mentioned configuration in FIG. 12 corresponds to the second configuration pattern.

A test system for the above-mentioned case of FIG. 12 is referred to as a second high-speed system.

In addition, tests based on two usual systems not corresponding to the second high-speed system are also performed. The first usual system is a test system for a low-speed section located at a destination-side end. In the first usual system, test data whose amount is small is used. In this case, sending is finished before a leading packet having been sent returns to the detecting device 101. The second usual system is a test system for a low-speed section located at a source-side end. In the second usual system, test data whose amount is large is used. In this case, sending is continued after a leading packet having been sent returns to the detecting device 101.

In the determination in the second configuration pattern, the above-mentioned three tests are performed. In addition, based on four determination patterns, the presence or absence of a mismatch in each section is determined. The four determination patterns will be described in order.

In the first determination pattern, in a case where no loss of test data is detected in the test of the first usual system, the test of the second usual system, and the test of the second high-speed system, a determination result is set to "no mismatch exists in any one of sections".

In the second determination pattern, in a case where a loss of test data is detected in the test of the first usual system, a determination result is set to "a mismatch exists in the third section". Note that no result in the test of the second usual system and no result in the test of the second high-speed system are involved in a determination result, in the second determination pattern.

In the third determination pattern, in a case where no loss of test data is detected in the test of the first usual system and a loss of test data is detected in the test of the second usual system, a determination result is set to "a mismatch exists in the first section". Note that no result in the test of the second high-speed system is involved in a determination result, in the third determination pattern.

In the fourth determination pattern, in a case where no loss of test data is detected in the test of the first usual system and the test of the second usual system and a loss of test data is detected in the test of the second high-speed system, a determination result is set to "a mismatch exists in the second section". It is assumed that the fourth determination pattern satisfies the condition of a collision described in FIG. 14. This is the end of the description of the summary of the determination in the second configuration pattern.

Figure 29:
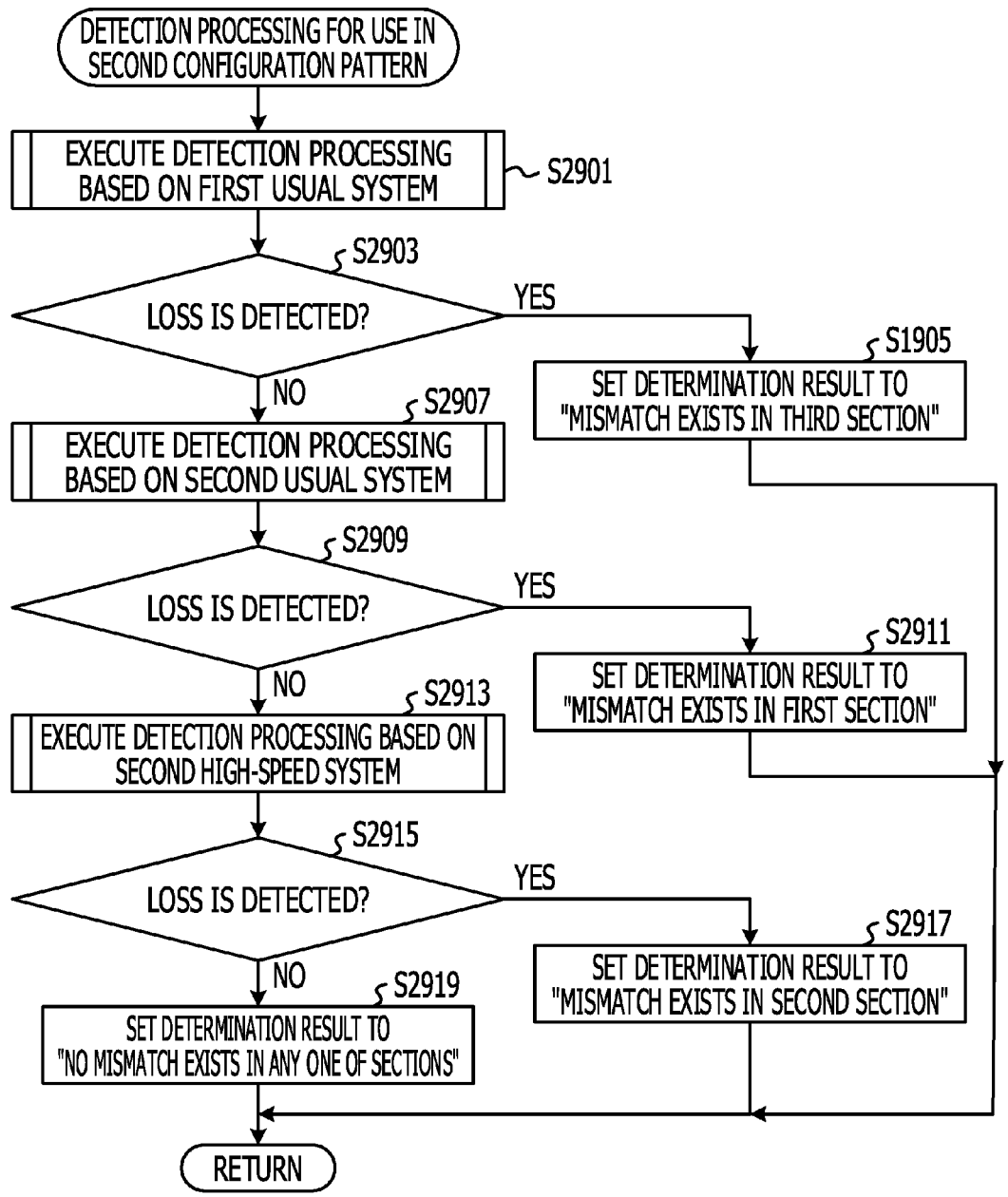
FIG. 29 illustrates a detection processing flow for use in a second configuration pattern.

Subsequently, detection processing according to the summary of the determination in the above-mentioned second configuration pattern will be described. FIG. 29 illustrates a detection processing flow for use in the second configuration pattern. First, the detecting device 101 executes detection processing based on the first usual system (S2901).

Figure 30:
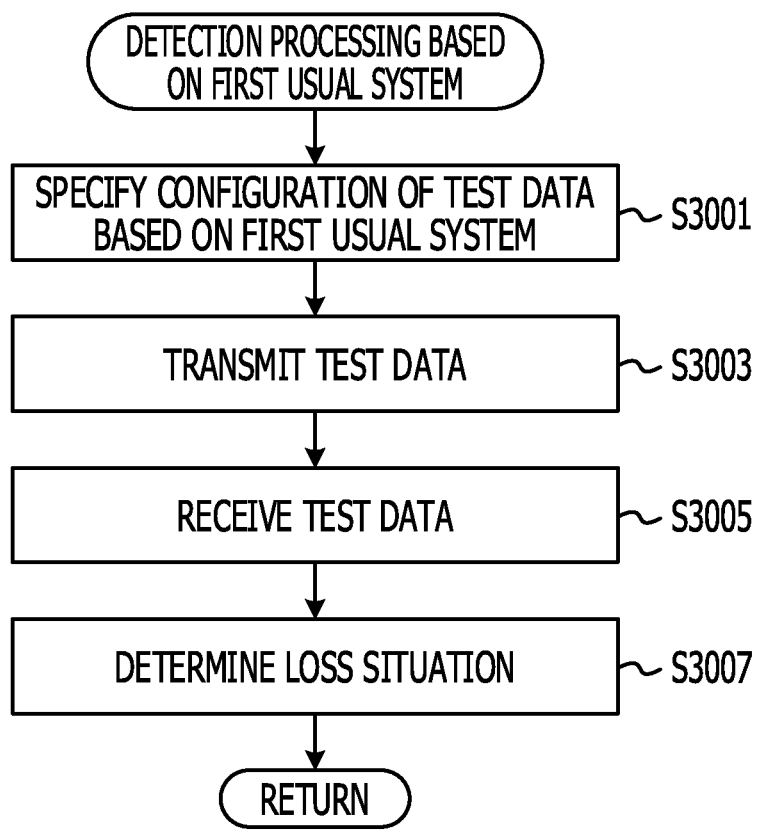
FIG. 30 illustrates a detection processing flow based on a first usual system.

FIG. 30 illustrates a detection processing flow based on the first usual system. The second specifying unit 1507 specifies the configuration of test data based on the first usual system (S3001). The configuration of test data based on the first usual system is a continuous test message, and corresponds to test data of the related art causing a collision to occur in a section in which low-speed communication is performed. In addition, the configuration of test data based on the usual system does not correspond to the configuration of test data in the second high-speed system. The size of test data based on the first usual system is subject to the condition that sending is finished before a leading packet having been sent returns to the detecting device 101.

In accordance with the specified configuration, the transmission unit 1509 transmits test data to the test target device 103 through a transmission path (S3003). At this time, there is issued an instruction to divide a return response message into packets and transmit the packets after packets included in a request message have been assembled in the test target device 103.

The reception unit 1511 receives test data from the transmission path (S3005). The test data received at this time is packets having arrived without being lost. All or part of the response message has disappeared in some cases.

The determination unit 1513 determines a loss situation (S3007). For example, the ratio of the number of received packets to the number of packets transmitted as the test data is calculated, and it is determined whether or not a loss rate exceeds a predetermined threshold value. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S2903 illustrated in FIG. 29.

Returning to the description of the detection processing flow for use in the second configuration pattern illustrated in FIG. 29, the determination unit 1513 branches the processing, based on whether a loss is detected or not, in other words, the above-mentioned status is "detection of a loss" or "detection of no loss" (S2903).

In a case of detecting a loss, the determination unit 1513 sets a determination result to "a mismatch exists in the third section" (S2905). This processing corresponds to the above-mentioned second determination pattern. In addition, the detection processing for use in the second configuration pattern finishes, and the processing returns to the processing operation in S1709 illustrated in FIG. 17.

On the other hand, in a case of detecting no loss, the detecting device 101 executes detection processing based on the second usual system (S2907).

Figure 31:
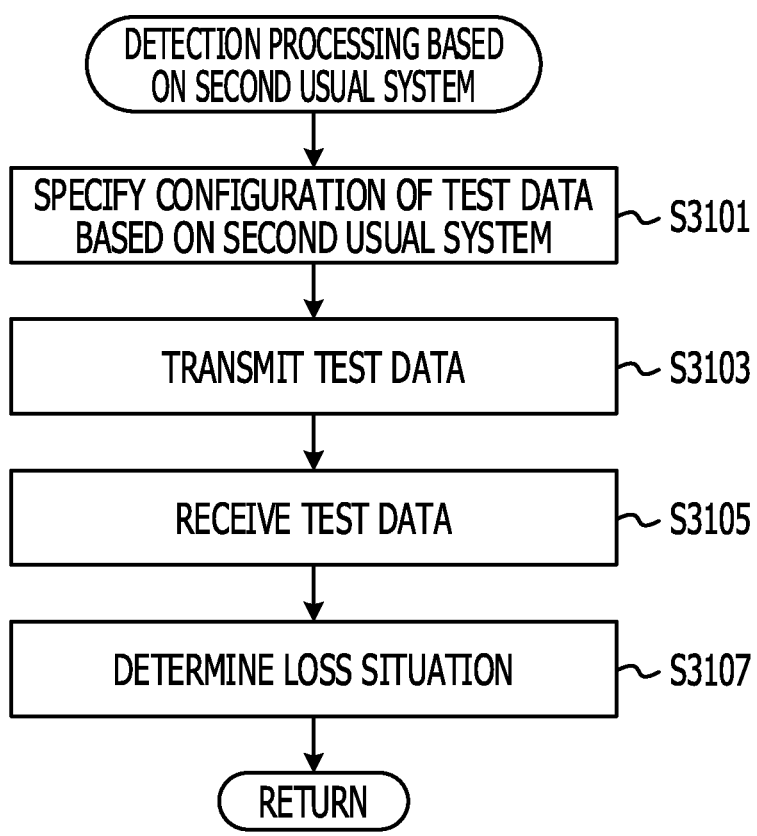
FIG. 31 illustrates a detection processing flow based on a second usual system.

FIG. 31 illustrates a detection processing flow based on the second usual system. The second specifying unit 1507 specifies the configuration of test data based on the second usual system (S3101). The configuration of test data based on the second usual system is a continuous test message, and corresponds to test data of the related art causing a collision to occur in a section in which low-speed communication is performed. In addition, the configuration of test data based on the usual system does not correspond to the configuration of test data in the second high-speed system. The size of test data based on the second usual system is subject to the condition that sending is continued after a leading packet having been sent returns to the detecting device 101.

In accordance with the specified configuration, the transmission unit 1509 transmits test data to the test target device 103 through a transmission path (S3103). At this time, there is issued an instruction to divide a return response message into packets and transmit the packets after packets included in a request message have been assembled in the test target device 103.

The reception unit 1511 receives test data from the transmission path (S3105). The test data received at this time is packets having arrived without being lost. All or part of the response message has disappeared in some cases.

The determination unit 1513 determines a loss situation (S3107). For example, in the same way as in S3007, the ratio of the number of received packets to the number of packets transmitted as the test data is calculated, and it is determined whether or not the ratio (referred to as a loss rate) exceeds a predetermined threshold value. In this regard, however, the predetermined threshold value may be the same as in the case of S3007 and different therefrom. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S2909 illustrated in FIG. 29.

Returning to the description of the detection processing flow for use in the second configuration pattern illustrated in FIG. 29, the determination unit 1513 branches the processing, based on whether a loss is detected or not, in other words, the above-mentioned status is "detection of a loss" or "detection of no loss" (S2909).

In a case of detecting a loss, the determination unit 1513 sets a determination result to "a mismatch exists in the first section" (S2911). This processing corresponds to the above-mentioned third determination pattern. In addition, the detection processing for use in the second configuration pattern finishes, and the processing returns to the processing operation in S1709 illustrated in FIG. 17.

On the other hand, in a case of detecting no loss, the detecting device 101 executes detection processing based on the second high-speed system (S2913).

Figure 32:
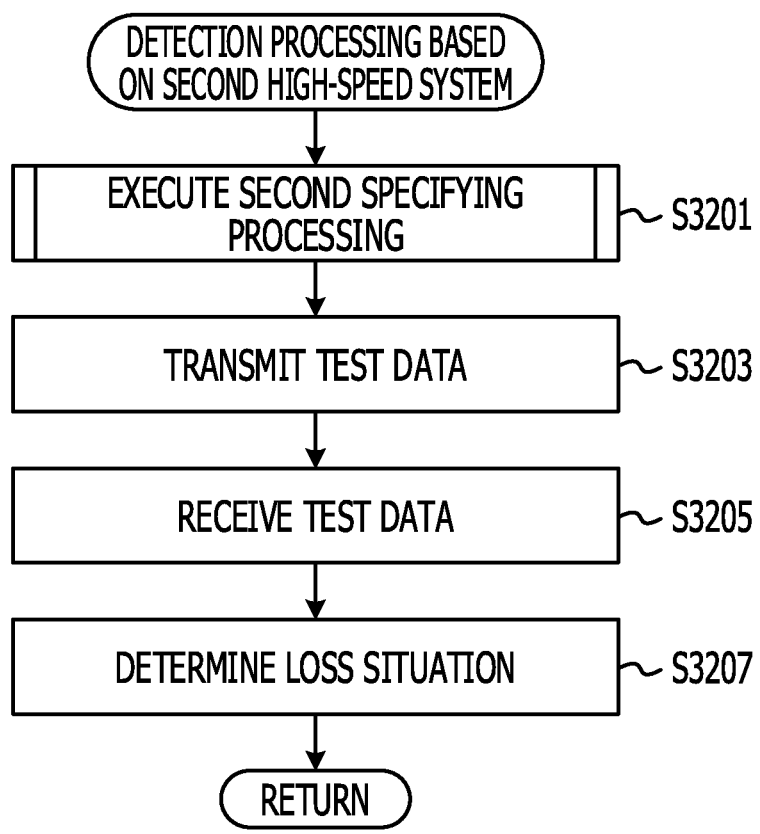
FIG. 32 illustrates a detection processing flow based on a second high-speed system.

FIG. 32 illustrates a detection processing flow based on the second high-speed system. As described above, the second high-speed system is based on the condition of a collision illustrated in FIG. 14.

The second specifying unit 1507 executes second specifying processing (S3201). In the second specifying processing, the configuration of test data based on the second high-speed system is specified. Here, examples of second specifying processing A, second specifying processing B, and second specifying processing C are illustrated.

Figure 33:
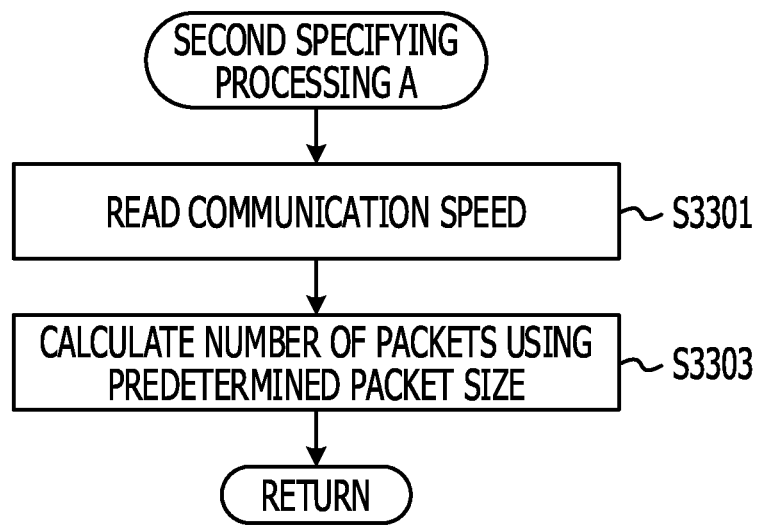
FIG. 33 illustrates a flow of second specifying processing A.

FIG. 33 illustrates the flow of the second specifying processing A. In this processing, a preliminarily set packet size is used. The second specifying unit 1507 reads a communication speed in each section from the configuration storage unit 1503 (S3301). In accordance with the above-mentioned expression (19) and expression (20), the second specifying unit 1507 calculates the number of packets using a predetermined packet size (S3303).

If, in the above-mentioned expression (19), the packet size P, the packet size Q, the communication speed La in the first section, the communication speed H in the second section, and the communication speed Lb in the third section are defined, the first range of the number n of packets is specified. Furthermore, if, in the above-mentioned expression (20), the packet size P, the packet size Q, the communication speed La in the first section, the communication speed H in the second section, and the communication speed Lb in the third section are defined, the second range of the number n of packets is specified. In addition, the second specifying unit 1507 calculates the number n of packets included in the first range and the second range. Note that a ratio between the communication speed La in the first section and the communication speed H in the second section, a ratio between the communication speed La in the first section and the communication speed Lb in the third section, or a ratio between the communication speed H in the second section and the communication speed Lb in the third section may be used. In addition, the processing returns to a processing operation in S3203 illustrated in FIG. 32.

Figure 34:
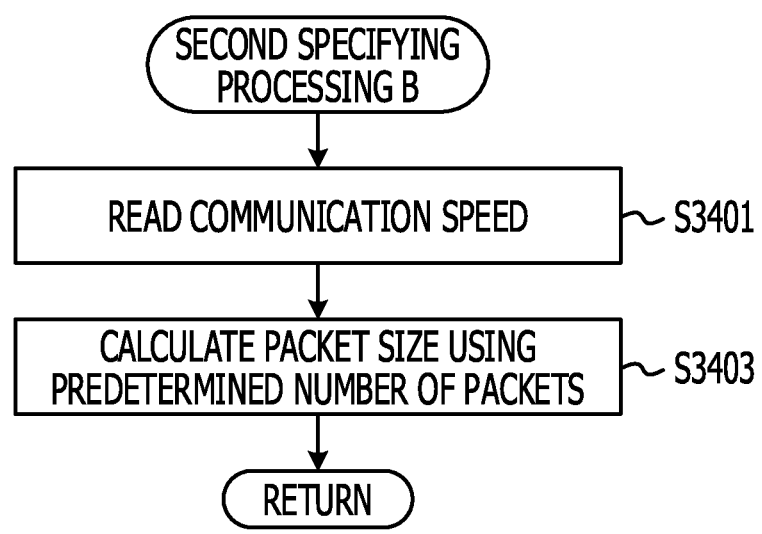
FIG. 34 illustrates a flow of second specifying processing B.

FIG. 34 illustrates the flow of the second specifying processing B. In this processing, the preliminarily set number of packets are used. The second specifying unit 1507 reads a communication speed in each section from the configuration storage unit 1503 (S3401). In accordance with the above-mentioned expression (19) and expression (20), the second specifying unit 1507 calculates a packet size using the predetermined number of packets (S2303).

If, in the above-mentioned expression (19), the number n of packets, the communication speed La in the first section, the communication speed H in the second section, and the communication speed Lb in the third section are defined, the first range of a ratio between the packet size P and the packet size Q is defined. Furthermore, if, in the above-mentioned expression (20), the number n of packets, the communication speed La in the first section, the communication speed H in the second section, and the communication speed Lb in the third section are defined, the second range of a ratio between the packet size P and the packet size Q is defined. The packet size P and the packet size Q are calculated so that a ratio Q/P included in the first range and the second range is obtained. Note that a ratio between the communication speed La in the first section and the communication speed H in the second section, a ratio between the communication speed La in the first section and the communication speed Lb in the third section, or a ratio between the communication speed H in the second section and the communication speed Lb in the third section may be used. In addition, the processing returns to the processing operation in S3203 illustrated in FIG. 32.

Figure 35:
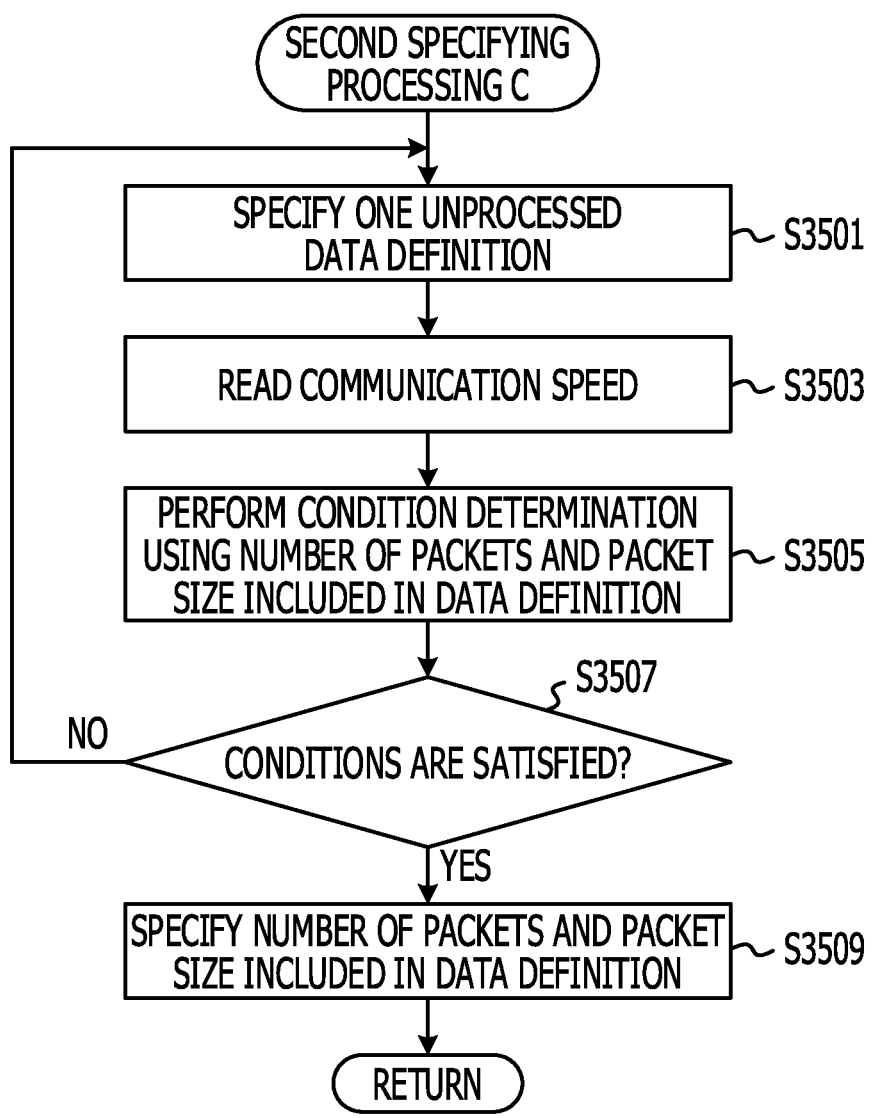
FIG. 35 illustrates a flow of second specifying processing C.

FIG. 35 illustrates the flow of the second specifying processing C. In this processing, a plurality of data definitions to serve as candidates are preliminarily registered in the configuration storage unit 1503. In addition, the second specifying unit 1507 specifies one of these data definitions, which satisfies a condition.

The second specifying unit 1507 specifies one unprocessed data definition (S3501). The second specifying unit 1507 reads a communication speed in each section from the configuration storage unit 1503 (S3503). Using the number of packets and a packet size included in the corresponding data definition, the second specifying unit 1507 performs condition determination for the above-mentioned expression (19) and expression (20) (S3505).

Based on the data definition, the second specifying unit 1507 specifies the packet size P, the packet size Q, and the number n of packets. In addition, based on the packet size P, the packet size Q, the number n of packets, the communication speed La in the first section, the communication speed H in the second section, and the communication speed Lb in the third section, the second specifying unit 1507 determines whether or not the expression (19) is satisfied. Furthermore, based on the packet size P, the packet size Q, the number n of packets, the communication speed La in the first section, the communication speed H in the second section, and the communication speed Lb in the third section, the second specifying unit 1507 determines whether or not the expression (20) is satisfied. Note that a ratio between the communication speed La in the first section and the communication speed H in the second section, a ratio between the communication speed La in the first section and the communication speed Lb in the third section, or a ratio between the communication speed H in the second section and the communication speed Lb in the third section may be used.

The second specifying unit 1507 determines whether or not both the condition of the above-mentioned expression (19) and the condition of the above-mentioned expression (20) are satisfied (S3507). In a case of determining that both of the conditions are satisfied, the second specifying unit 1507 specifies the number of packets and a packet size included in the corresponding data definition (S3509). In addition, the processing returns to the processing operation in S3203 illustrated in FIG. 32.

On the other hand, in a case of determining that the above-mentioned conditions are not satisfied, the second specifying unit 1507 returns to the processing operation in S3501, and repeats a series of processing operations. This is the end of the description of the second specifying processing.

Returning to the processing illustrated in FIG. 32, the transmission unit 1509 transmits test data to the test target device 103 through the transmission path, in accordance with the specified configuration (S3203). At this time, there is issued an instruction to divide a return response message into packets and transmit the packets after packets included in a request message have been assembled in the test target device 103.

The reception unit 1511 receives test data from the transmission path (S3205). As described above, the test data received at this time is packets having arrived without being lost. All or part of the response message has disappeared in some cases.

The determination unit 1513 determines a loss situation (S3207). For example, in the same way as in S3007 or S3107, the ratio of the number of received packets to the number of packets transmitted as the test data is calculated, and it is determined whether or not a loss rate exceeds a predetermined threshold value. In this regard, however, the predetermined threshold value may be the same as in the case of S3007 or S3107 and different therefrom. In a case of determining that the loss rate exceeds the predetermined threshold value, a status is set to "detection of a loss". In a case of determining that the loss rate does not exceed the predetermined threshold value, a status is set to "detection of no loss". In addition, the processing returns to a processing operation in S2915 illustrated in FIG. 29.

The determination unit 1513 branches the processing, based on whether a loss is detected or not, in other words, the above-mentioned status is "detection of a loss" or "detection of no loss" (S2915).

In a case of detecting a loss, the determination unit 1513 sets a determination result to "a mismatch exists in the second section" (S2917). This processing corresponds to the above-mentioned fourth determination pattern. In addition, the detection processing for use in the second configuration pattern finishes, and the processing returns to the processing operation in S1709 illustrated in FIG. 17.

On the other hand, in a case of detecting no loss, the determination unit 1513 sets a determination result to "no mismatch exists in any one of sections" (S2919). This processing corresponds to the above-mentioned first determination pattern. In addition, the detection processing for use in the second configuration pattern finishes, and the processing returns to the processing operation in S1709 illustrated in FIG. 17.

Returning to the description of the main processing flow illustrated in FIG. 17, the output unit 1515 outputs a determination result (S1709).

According to the present embodiment, it is possible to cause a packet of a response message and a packet of a request message to collide with each other, in accordance with the above-mentioned conditional expression, and enhance the accuracy of the detection of a mismatch based on a packet loss.

Furthermore, even in a case where communication speeds in individual sections are different, it is possible to cause a packet of a response message and a packet of a request message to collide with each other.

Furthermore, based on times when packets whose sizes are different are transmitted, it becomes easy to cause a packet of a response message and a packet of a request message to collide with each other.

Furthermore, it is possible to specify a section put into a mismatch from among a plurality of sections, with a high degree of accuracy.

While an embodiment of the present technology has been described as above, the present technology is not limited to this. For example, in some cases, the above-mentioned functional block configuration does not correspond to an actual program module configuration.

In addition, the configuration of each storage area described above is an example, and another configuration other than the above-mentioned configuration may be adopted. Furthermore, in the processing flow, the sequence of processing may be shuffled if a processing result does not change. Furthermore, the processing flow may be executed in parallel.

Figure 36:
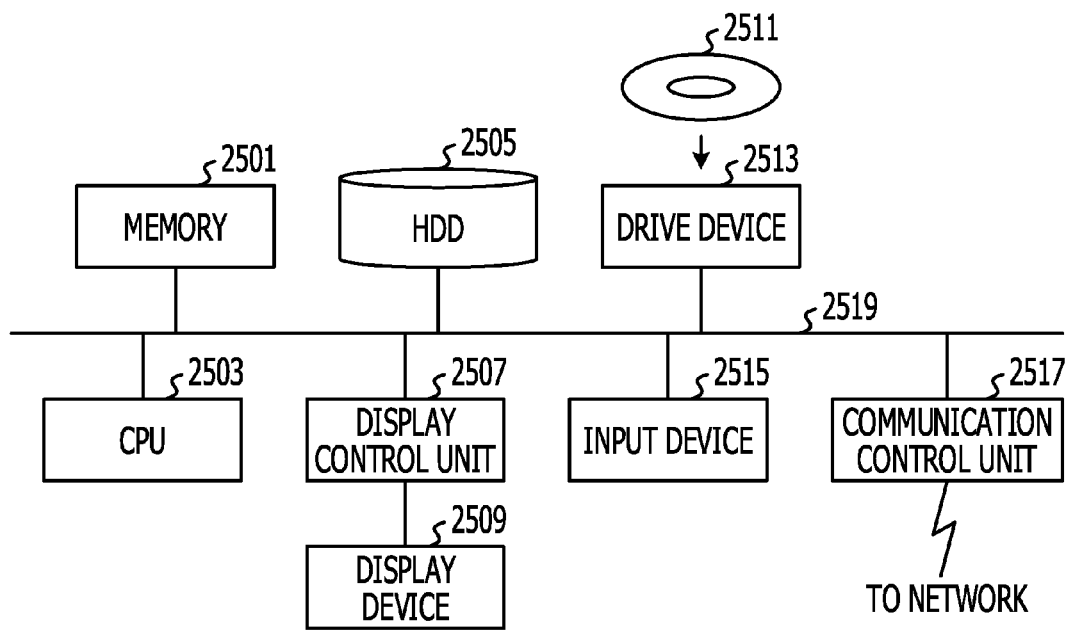
FIG. 36 is a functional block diagram of a computer.

In addition, the detecting device 101 described above is a computer device, and includes, for example, a memory 2501, a central processing unit (CPU) 2503, a hard disk drive (HDD) 2505, a display control unit 2507 connected to a display device 2509, a drive device 2513 for use in a removable disk 2511, an input device 2515, a communication control unit 2517 used for connecting to a network, as illustrated in FIG. 36, and these are connected through a bus 2519. An operating system (OS) and an application program used for implementing the processing in the present embodiment are stored in the HDD 2505, and read out from the HDD 2505 to the memory 2501 at the time of being executed by the CPU 2503. The CPU 2503 controls the display control unit 2507, the communication control unit 2517, and the drive device 2513 in response to the content of processing of the application program, and causes predetermined operations to be performed. In addition, while being mainly stored in the memory 2501, data in processing may be stored in the HDD 2505. In the present embodiment, the application program used for implementing the above-mentioned processing is distributed with being stored in a computer-readable removable disk 2511, and installed from the drive device 2513 into the HDD 2505. In some case, the application program is installed into the HDD 2505 through a network such as Internet and the communication control unit 2517. In such a computer device, pieces of hardware such as the CPU 2503 and the memory 2501 described above and programs such as the OS and the application program organically collaborate with one another, and hence, such various kinds of functions as described above are realized.

An embodiment of the above-mentioned present technology is summarized as follows.

A mismatch detecting method according to the present embodiment includes (A) specifying processing that specifies a configuration of test data in accordance with a condition in which a time when a first packet out of a plurality of packets included in the test data caused to make a round trip through a transmission path including a plurality of sections is transmitted in one section out of the plural sections in an inbound path and a time when a second packet out of the plural packets is transmitted in the one section in an outbound path overlap with each other, (B) processing that transmits the test data to the transmission path in accordance with the configuration specified by the specifying processing, and (C) determination processing that determines a mismatch of a transmission system within the transmission path, based on a loss situation of the test data returning from the transmission path after the transmitting processing.

By doing this, it is possible to cause the first packet and the second packet to collide with each other, and enhance the accuracy of the detection of a mismatch based on a packet loss.

Furthermore, the above-mentioned condition may be defined based on communication speeds in the individual plural sections or a ratio between communication speeds in the individual plural sections.

By doing this, it is possible to cause the first packet and the second packet to collide with each other even in a case where communication speeds are different in individual sections.

Furthermore, in the specifying processing, a configuration where sizes of some packets out of the plural packets are different from a size of another packet may be specified.

By doing this, it becomes easy to cause the first packet and the second packet to collide with each other, based on times when packets whose sizes are different are transmitted.

Furthermore, in the determination processing, it may be determined that the mismatch exists in the one section.

By doing this, it is possible to specify a section put into a mismatch from among the plural sections, with a high degree of accuracy.

In addition, it is possible to create a program used for causing a computer to execute the processing based on the above-mentioned method, and the program may be stored in a computer-readable storage medium such as, for example, a flexible disk, a CD-ROM, a magnet-optical disk, a semiconductor memory, or a hard disk, or a storage device. Note that in general an intermediate processing result is temporarily retained in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mismatch detecting method comprising:
    specifying a configuration of test data in accordance with a condition in which a time when a first packet out of a plurality of packets included in the test data caused to make a round trip through a transmission path including a plurality of sections is transmitted in one section out of the plurality of sections in an inbound path and a time when a second packet out of the plurality of packets is transmitted in the one section in an outbound path overlap with each other;

transmitting the test data to the transmission path in accordance with the configuration specified by the specifying; and determining a mismatch of a transmission system within the transmission path, based on a loss situation of the test data returning from the transmission path after the transmitting, wherein the specifying specifies a configuration where sizes of some packets out of the plurality of packets are different from a size of another packet among the plurality of packets.

2. The mismatch detecting method according to claim 1, wherein the condition is defined based on communication speeds in the plurality of sections or a ratio between communication speeds in the plurality of sections.

3. The mismatch detecting method according to claim 1, wherein the determining determines that the mismatch exists in the one section.

4. A detecting device, comprising:

a memory; and a processor coupled to the memory and configured to:

specify a configuration of test data in accordance with a condition in which a time when a first packet out of a plurality of packets included in the test data caused to make a round trip through a transmission path including a plurality of sections is transmitted in one section out of the plurality of sections in an inbound path and a time when a second packet out of the plurality of packets is transmitted in the one section in an outbound path overlap with each other, transmit the test data to the transmission path in accordance with the configuration specified, and determine a mismatch of a transmission system within the transmission path, based on a loss situation of the test data returning from the transmission path after the transmitting of the test data, wherein the processor is configured to specify a configuration where sizes of some packets out of the plurality of packets are different from a size of another packet among the plurality of packets.

5. The detecting device according to claim 4, wherein the condition is defined based on communication speeds in the plurality of sections or a ratio between communication speeds in the plurality of sections.

6. The detecting device according to claim 4, wherein the processor is configured to determine that the mismatch exists in the one section.

7. A non-transitory computer-readable recording medium storing a program that causes a computer to execute a process, the process comprising:

specifying a configuration of test data in accordance with a condition in which a time when a first packet out of a plurality of packets included in the test data caused to make a round trip through a transmission path including a plurality of sections is transmitted in one section out of the plurality of sections in an inbound path and a time when a second packet out of the plurality of packets is transmitted in the one section in an outbound path overlap with each other;

transmitting the test data to the transmission path in accordance with the configuration specified by the specifying; and determining a mismatch of a transmission system within the transmission path, based on a loss situation of the test data returning from the transmission path after the transmitting, wherein the specifying specifies a configuration where sizes of some packets out of the plurality of packets are different from a size of another packet among the plurality of packets.

8. The non-transitory computer-readable recording medium according to claim 7, wherein the condition is defined based on communication speeds in the plurality of sections or a ratio between communication speeds in the plurality of sections.

9. The non-transitory computer-readable recording medium according to claim 7, wherein the determining determines that the mismatch exists in the one section.

* * * * *